US012124848B2

(12) United States Patent
Iwakawa

(10) Patent No.: US 12,124,848 B2
(45) Date of Patent: Oct. 22, 2024

(54) INFORMATION PROCESSING APPARATUS, INFORMATION PROCESSING METHOD, AND PROGRAM

(71) Applicant: NEC Corporation, Tokyo (JP)

(72) Inventor: Kento Iwakawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 674 days.

(21) Appl. No.: 17/277,532

(22) PCT Filed: Aug. 21, 2019

(86) PCT No.: PCT/JP2019/032671
§ 371 (c)(1),
(2) Date: Mar. 18, 2021

(87) PCT Pub. No.: WO2020/066375
PCT Pub. Date: Apr. 2, 2020

(65) Prior Publication Data
US 2021/0349719 A1   Nov. 11, 2021

(30) Foreign Application Priority Data

Sep. 25, 2018 (JP) .................. 2018-178791

(51) Int. Cl.
*G06F 9/30* (2018.01)
*G06F 8/41* (2018.01)

(52) U.S. Cl.
CPC ........ *G06F 9/30036* (2013.01); *G06F 8/4441* (2013.01); *G06F 9/30018* (2013.01); *G06F 9/30065* (2013.01); *G06F 9/30101* (2013.01)

(58) Field of Classification Search
CPC ............... G06F 8/4441; G06F 9/30036; G06F 9/30018; G06F 9/30065; G06F 9/30101
See application file for complete search history.

(56) References Cited

U.S. PATENT DOCUMENTS 5,123,095 A * 6/1992 Papadopoulos ..... G06F 15/8061
712/E9.034
7,793,084 B1 * 9/2010 Mimar ................ G06F 9/30036
712/236

(Continued)

FOREIGN PATENT DOCUMENTS

EP          3336692 A1    6/2018
JP       H01-191266 A    8/1989

(Continued)

OTHER PUBLICATIONS

Japanese Office Communication for JP Application No. 2020-548162 mailed on Apr. 19, 2022 with English Translation.

(Continued)

*Primary Examiner* — Douglas M Slachta

(57) ABSTRACT

An information processing apparatus according to the present invention includes: a load instruction generating unit configured to generate an instruction to continuously access a memory in which a real part and an imaginary part composing complex data are alternately arranged, in accordance with arrangement of the real part and the imaginary part, and load the real part and the imaginary part as respective elements of a vector register; and an operation instruction generating unit configured to generate a vector operation instruction including an instruction to perform a vector operation of elements corresponding to element numbers different from each other between two vector registers and an instruction to perform a masked vector operation.

10 Claims, 31 Drawing Sheets

(56) References Cited

U.S. PATENT DOCUMENTS

| | | | | |
|---|---|---|---|---|
| 8,667,042 | B2* | 3/2014 | Wiedemeier | G06F 9/30014 |
| | | | | 712/7 |
| 9,378,017 | B2* | 6/2016 | Uliel | G06F 9/30109 |
| 10,203,954 | B2* | 2/2019 | Ould-Ahmed-Vall | ............ |
| | | | | G06F 9/30032 |
| 10,628,155 | B2* | 4/2020 | Grocutt | G06F 9/30145 |
| 10,824,586 | B2* | 11/2020 | Moudgill | G06F 9/30036 |
| 11,036,506 | B1* | 6/2021 | Redington | G06F 9/30032 |
| 2005/0125476 | A1 | 6/2005 | Symes et al. | |
| 2011/0040822 | A1* | 2/2011 | Eichenberger | G06F 9/30032 |
| | | | | 708/607 |
| 2012/0233443 | A1* | 9/2012 | Sebot | G06F 9/30112 |
| | | | | 712/E9.034 |
| 2012/0254589 | A1* | 10/2012 | Corbal San Adrian | ............ |
| | | | | G06F 9/30018 |
| | | | | 712/E9.034 |
| 2013/0275729 | A1* | 10/2013 | Abraham | G06F 9/30032 |
| | | | | 712/221 |
| 2013/0283018 | A1* | 10/2013 | Ould-Ahmed-Vall | ............ |
| | | | | G06F 9/30043 |
| | | | | 712/225 |
| 2014/0095828 | A1* | 4/2014 | Plotnikov | G06F 15/8084 |
| | | | | 712/5 |
| 2014/0189288 | A1* | 7/2014 | Hartono | G06F 9/3001 |
| | | | | 712/5 |
| 2014/0281371 | A1* | 9/2014 | Thantry | G06F 9/30036 |
| | | | | 712/7 |
| 2014/0297994 | A1 | 10/2014 | Grochowski et al. | |
| 2015/0095623 | A1* | 4/2015 | Ermolaev | G06F 9/30043 |
| | | | | 712/222 |
| 2016/0062673 | A1* | 3/2016 | Tiwari | G06F 9/3001 |
| | | | | 711/154 |
| 2016/0188334 | A1* | 6/2016 | Lee | G06F 9/30036 |
| | | | | 712/7 |
| 2016/0224514 | A1* | 8/2016 | Moudgill | G06F 9/3836 |
| 2017/0177340 | A1* | 6/2017 | Jha | G06F 9/30036 |
| 2017/0177362 | A1* | 6/2017 | Jha | G06F 9/30036 |
| 2018/0088946 | A1* | 3/2018 | Malladi | G06F 9/3001 |
| 2018/0095758 | A1* | 4/2018 | Dubtsov | G06F 9/3001 |
| 2019/0012171 | A1* | 1/2019 | Plotnikov | G06F 9/30036 |
| 2019/0163473 | A1* | 5/2019 | Valentine | G06F 9/3001 |

FOREIGN PATENT DOCUMENTS

| | | |
|---|---|---|
| JP | H10-307814 A | 11/1998 |
| JP | H11-126200 A | 5/1999 |
| JP | 2005-174295 A | 6/2005 |
| JP | 2014-199663 A | 10/2014 |
| JP | 2015-106325 A | 6/2015 |
| WO | 2017/168118 A1 | 10/2017 |

OTHER PUBLICATIONS

International Search Report for PCT Application No. PCT/JP2019/032671, mailed on Nov. 19, 2019.

* cited by examiner

Fig.8

ADDITION OF COMPLEX NUMBERS $$(a + bi) + (c + di) = (a + c) + (b + d)i$$

SUBTRACTION OF COMPLEX NUMBERS $$(a + bi) - (c + di) = (a - c) + (b - d)i$$

MULTIPLICATION OF COMPLEX NUMBERS $$(a + bi)(c + di) = (ac - bd) + (bc + ad)i$$

DIVISION OF COMPLEX NUMBERS $$\frac{a + bi}{c + di} = \frac{ac + bd}{c^2 + d^2} + \frac{bc - ad}{c^2 + d^2}i$$

Fig.9

SOURCE PROGRAM
ADDITION OF COMPLEX NUMBERS

```
COMPLEX(KIND=4), :: A(16),B(16),C(16)
DO I = 1, 16
  C(I) = A(I) + B(I)
ENDDO
END
```

Fig.10

SOURCE PROGRAM
SUBTRACTION OF COMPLEX NUMBERS

```
COMPLEX(KIND=4), :: A(16),B(16),C(16)
DO I = 1, 16
  C(I) = A(I) - B(I)
ENDDO
END
```

Fig.11

SOURCE PROGRAM
MULTIPLICATION OF COMPLEX NUMBERS

```
COMPLEX(KIND=4), :: A(16),B(16),C(16)
DO I = 1, 16
  C(I) = A(I) * B(I)
ENDDO
END
```

Fig.12

SOURCE PROGRAM
DIVISION OF COMPLEX NUMBERS

```
COMPLEX(KIND=4), :: A(16),B(16),C(16)
DO I = 1, 16
 C(I) = A(I) / B(I)
ENDDO
END
```

Fig.16

SOURCE PROGRAM
MULTIPLICATION OF COMPLEX NUMBERS

```
COMPLEX(KIND=4), :: A(16),B(16),C(16)
DO I = 1, 16
  C(I) = A(I) * B(I)
ENDDO
END
```

COMPILE ⟶

GENERATED INSTRUCTION

```
OR     sreg1,0,32
LVL    sreg1
VLD    vreg1,4,addressA
VLD    vreg2,4,addressB
VMUL   vreg3,vreg1,vreg2,vm1
VNEG   vreg4,vreg3,vm1
VXSUB  vreg5,vreg4,vreg4,vm10
VXMUL  vreg6,vreg1,vreg2,vm1
VXADD  vreg5,vreg6,vreg6,vm01
VST    vreg5,4,addressC
```

OR    : OR INSTRUCTION
LVL   : VECTOR LENGTH LOAD INSTRUCTION
VLD   : VECTOR LOAD INSTRUCTION
VST   : VECTOR STORE INSTRUCTION
VNEG  : VECTOR SIGN INVERSION INSTRUCTION
VMUL  : MASKED VECTOR MULTIPLICATION INSTRUCTION
VXADD : MASKED VECTOR CROSS ADDITION INSTRUCTION
VXSUB : MASKED VECTOR CROSS SUBTRACTION INSTRUCTION
VXMUL : MASKED VECTOR CROSS MULTIPLICATION INSTRUCTION

VECTOR MASK REGISTER
vm1  =111111···
vm01 =010101···
vm10 =101010···

Fig.18
1. PERFORM MULTIPLICATION OF REAL PARTS AND MULTIPLICATION OF IMAGINARY PARTS BY MASKED VECTOR MULTIPLICATION
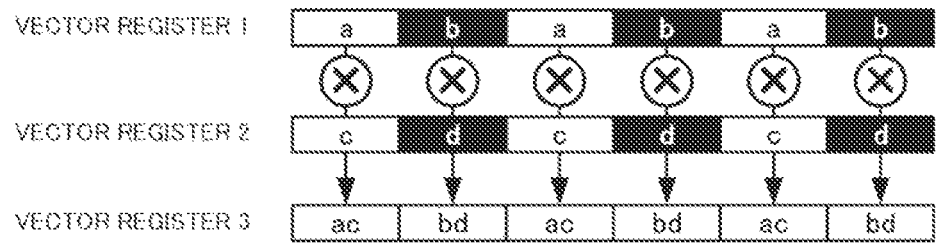
2. INVERSE SIGN OF MULTIPLICATION RESULT BY MASKED VECTOR SIGN INVERSION INSTRUCTION
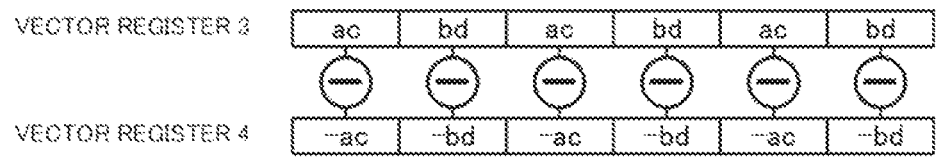
3. PERFORM SUBTRACTION OF MULTIPLICATION RESULTS BY MASKED VECTOR CROSS SUBTRACTION
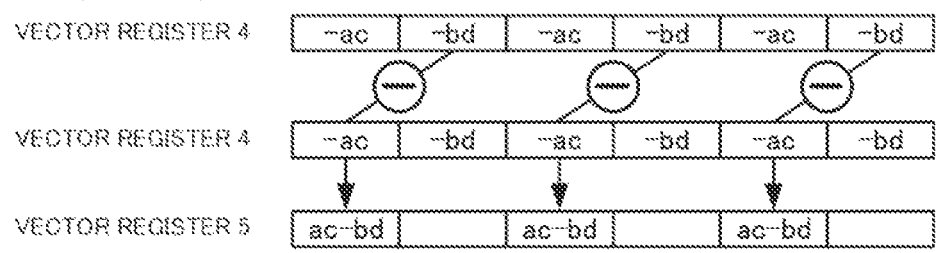

Fig.19
1. PERFORM MULTIPLICATION OF REAL PARTS AND MULTIPLICATION OF IMAGINARY PARTS BY MASKED VECTOR CROSS MULTIPLICATION
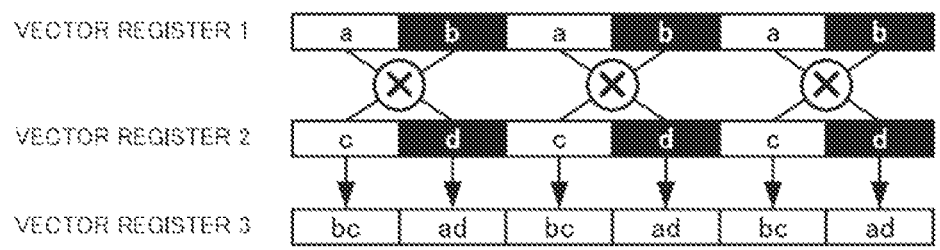
2. PERFORM ADDITION OF MULTIPLICATION RESULTS BY MASKED VECTOR CROSS ADDITION
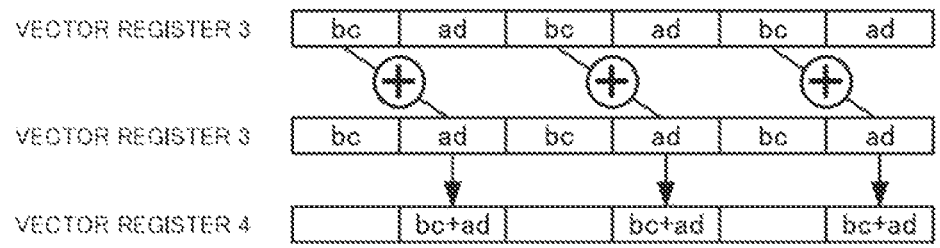

Fig.20

1. PERFORM MULTIPLICATION OF REAL PARTS AND MULTIPLICATION OF IMAGINARY PARTS BY MASKED VECTOR MULTIPLICATION

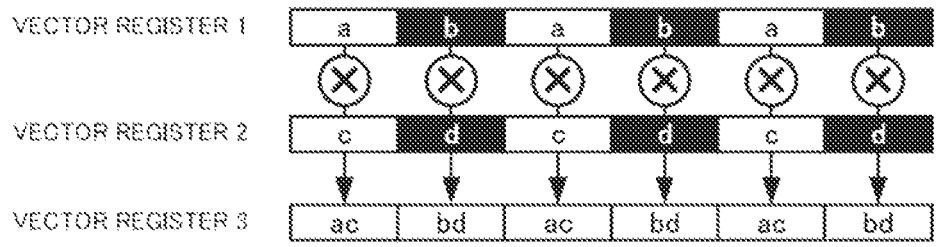

2. PERFORM ADDITION OF MULTIPLICATION RESULTS BY MASKED VECTOR CROSS ADDITION

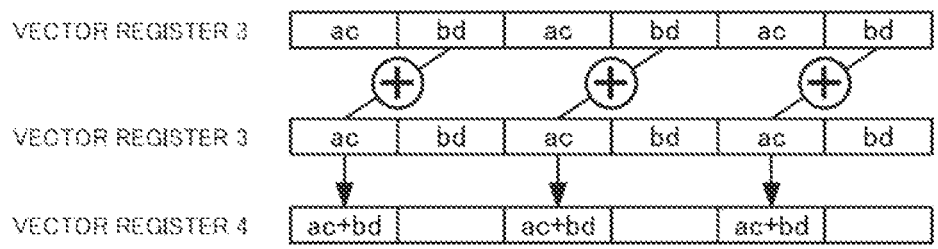

3. SQUARE REAL PART AND IMAGINARY PART OF DENOMINATOR BY MASKED VECTOR MULTIPLICATION

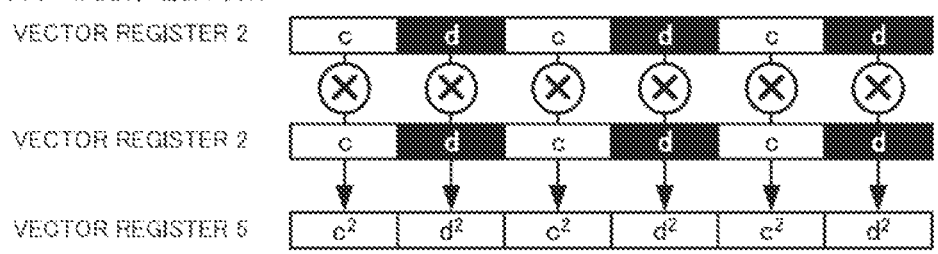

4. PERFORM ADDITION OF MULTIPLICATION RESULTS BY MASKED VECTOR CROSS ADDITION

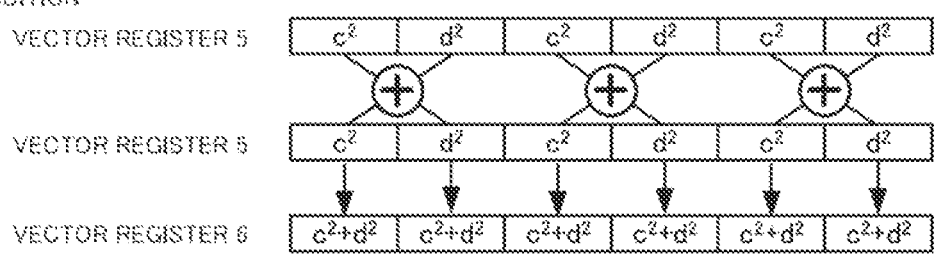

5. PERFORM DIVISION BY MASKED VECTOR DIVISION

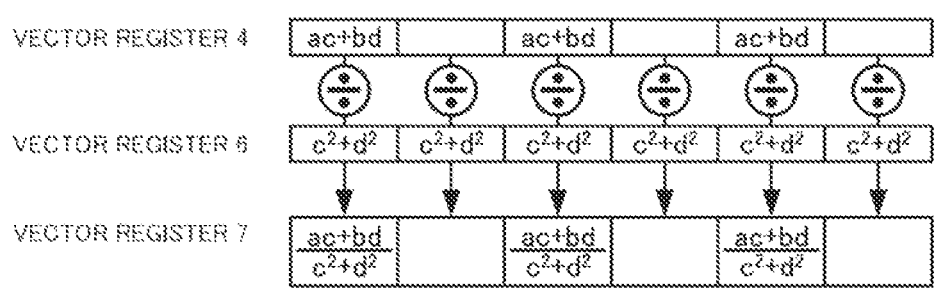

Fig.21

1. PERFORM MULTIPLICATION OF REAL PARTS AND MULTIPLICATION OF IMAGINARY PARTS BY MASKED VECTOR CROSS MULTIPLICATION

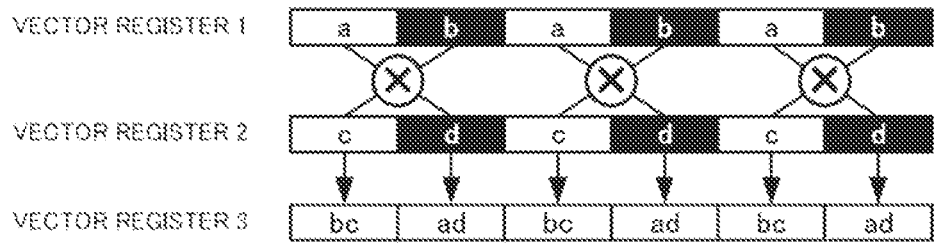

2. PERFORM SUBTRACTION OF MULTIPLICATION RESULTS BY MASKED VECTOR CROSS SUBTRACTION

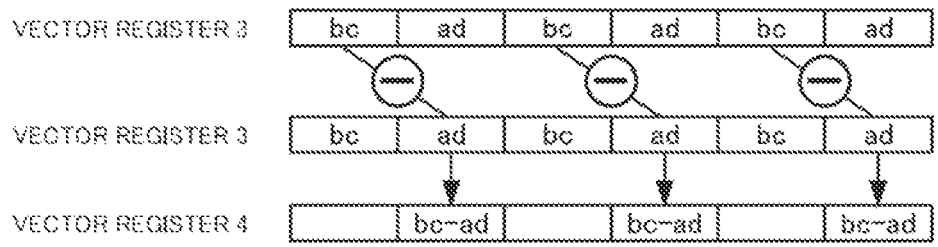

3. SQUARE REAL PART AND IMAGINARY PART OF DENOMINATOR BY MASKED VECTOR MULTIPLICATION

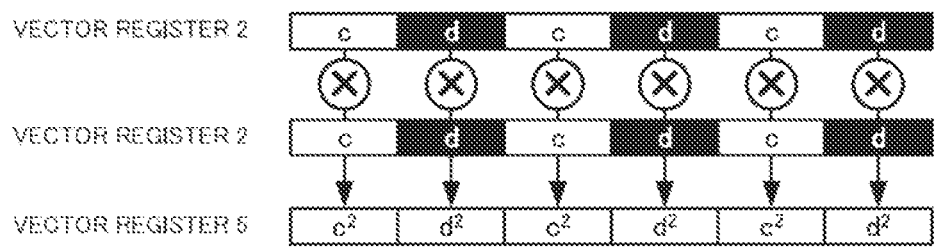

4. PERFORM ADDITION OF MULTIPLICATION RESULTS BY MASKED VECTOR CROSS ADDITION

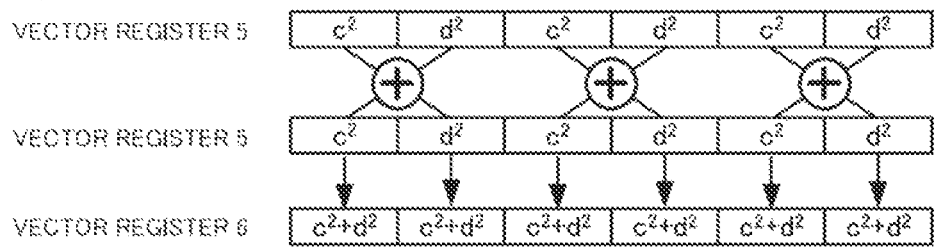

5. PERFORM DIVISION BY MASKED VECTOR DIVISION

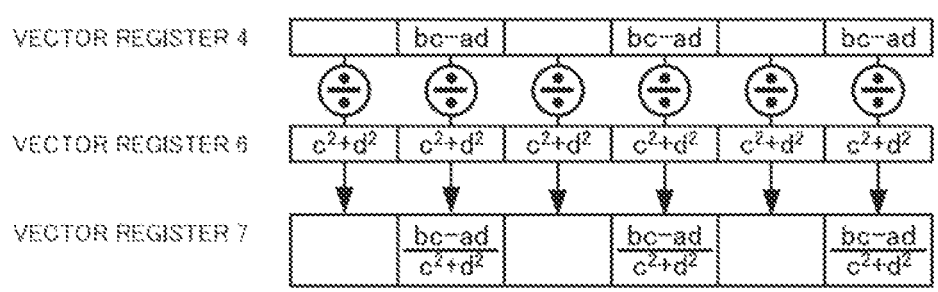

Fig.23

SOURCE PROGRAM
MULTIPLICATION OF COMPLEX NUMBERS

```
COMPLEX(KIND=4) :: A(16),B(16),C(16)
DO I = 1, 16
  C(I) = A(I) * B(I)
ENDDO
END
```

COMPILE

GENERATED INSTRUCTION

```
OR    sreg1,0,32
LVL   sreg1
VLD   vreg1,4,addressA
VLD   vreg2,4,addressB
VMUL  vreg3,vreg1,vreg2,vm1
OR    sreg2,0,1
VMV   vreg4,sreg2,sreg3
VSUB  vreg5,vreg3,vreg4,vm10
SUB   sreg3,sreg1,sreg2
VMV   vreg6,sreg3,vreg1
VMV   vreg7,sreg3,vreg2
VMUL  vreg8,vreg1,vreg7,vm01
VMUL  vreg9,vreg2,vreg6,vm01
VADD  vreg5,vreg8,vreg9,vm01
VST   vreg5,4,addressC
```

OR   : SCALAR OR INSTRUCTION
SUB  : SCALAR SUBTRACTION INSTRUCTION
LVL  : VECTOR LENGTH LOAD INSTRUCTION
VLD  : VECTOR LOAD INSTRUCTION
VST  : VECTOR STORE INSTRUCTION
VADD : MASKED VECTOR ADDITION INSTRUCTION
VSUB : MASKED VECTOR SUBTRACTION INSTRUCTION
VMUL : MASKED VECTOR MULTIPLICATION INSTRUCTION
VMV  : VECTOR TRANSFER INSTRUCTION

VECTOR MASK REGISTER
vm1  =111111···
vm01 =010101···
vm10 =101010···

Fig.25
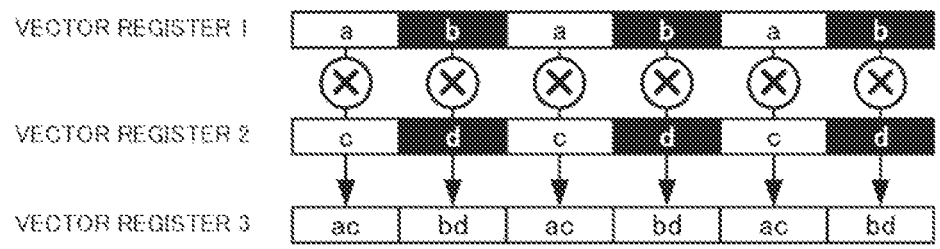
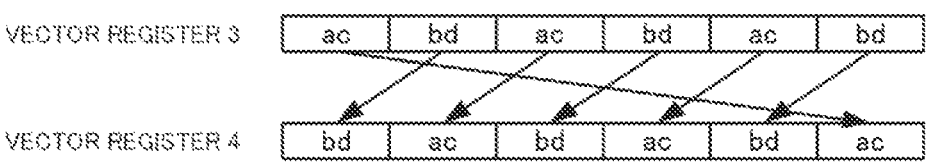
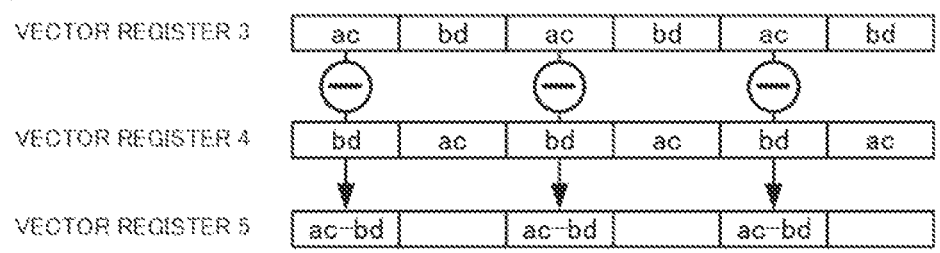

Fig.26
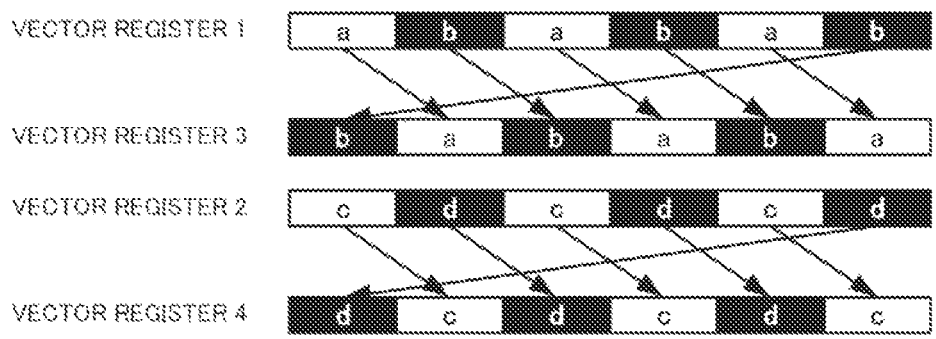
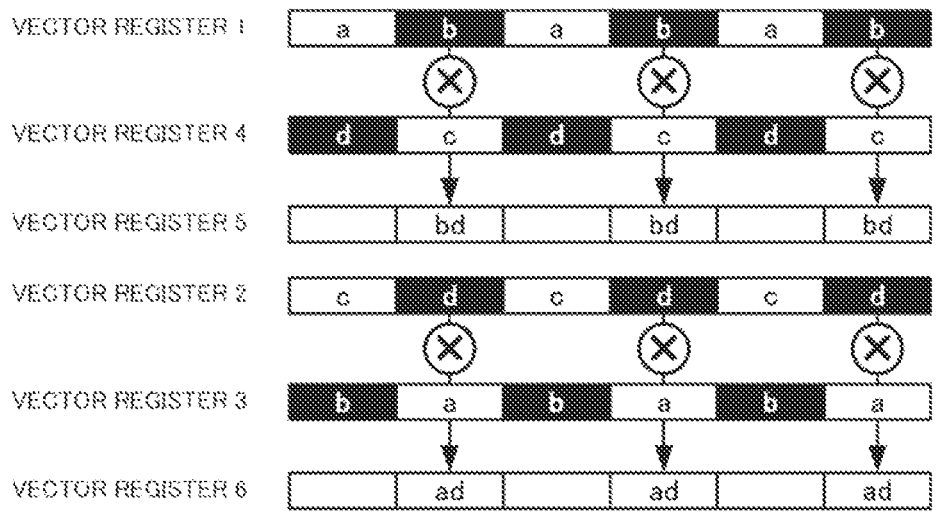
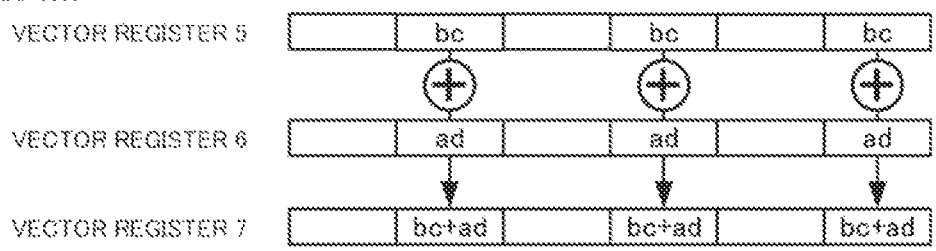

Fig.27

1. PERFORM MULTIPLICATION OF REAL PARTS AND MULTIPLICATION OF IMAGINARY PARTS BY MASKED VECTOR MULTIPLICATION

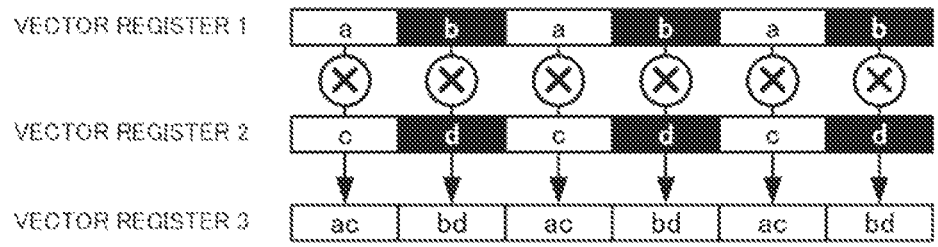

2. TRANSFER ELEMENTS BY VECTOR TRANSFER INSTRUCTION

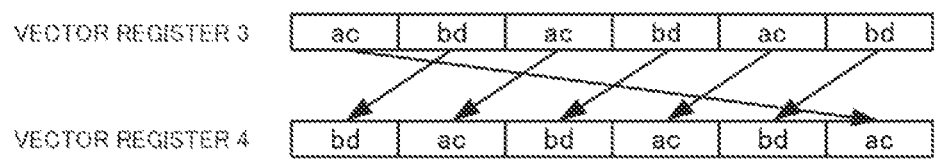

3. PERFORM ADDITION OF MULTIPLICATION RESULTS BY MASKED VECTOR ADDITION

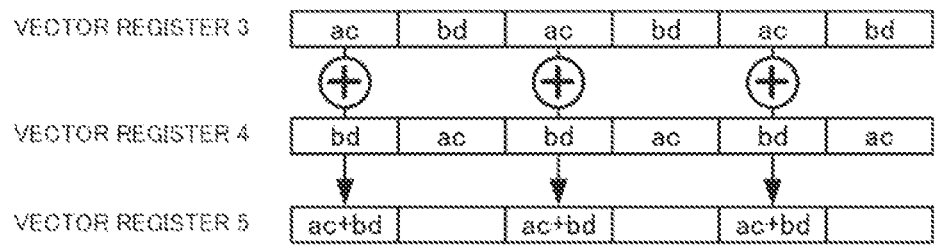

4. SQUARE REAL PART AND IMAGINARY PART OF DENOMINATOR BY MASKED VECTOR MULTIPLICATION

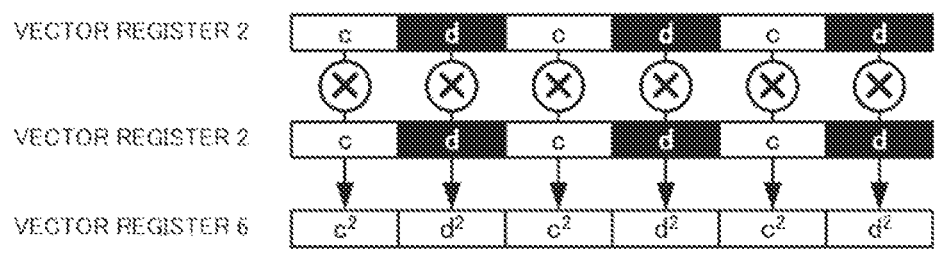

5. TRANSFER ELEMENTS BY VECTOR TRANSFER INSTRUCTION

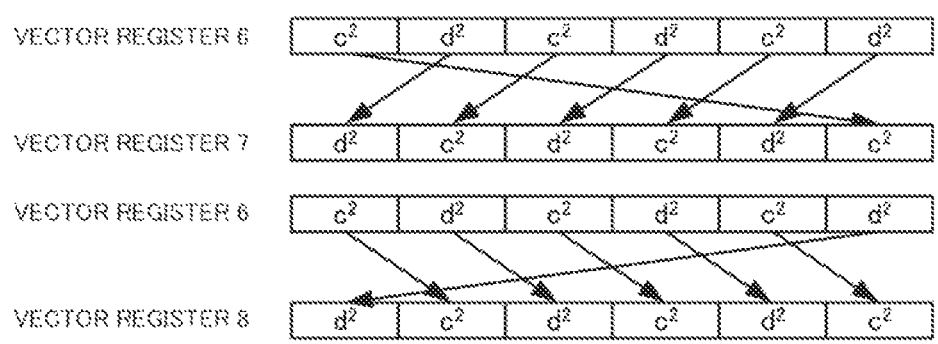

Fig.28
6. PERFORM ADDITION OF SQUARE OF REAL PART AND SQUARE OF IMAGINARY PART BY MASKED VECTOR ADDITION
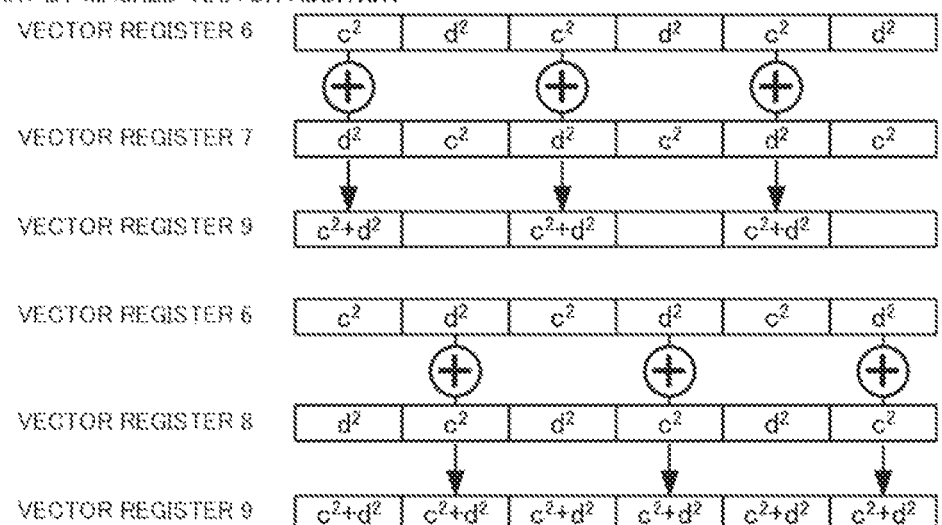
7. PERFORM DIVISION BY MASKED VECTOR DIVISION
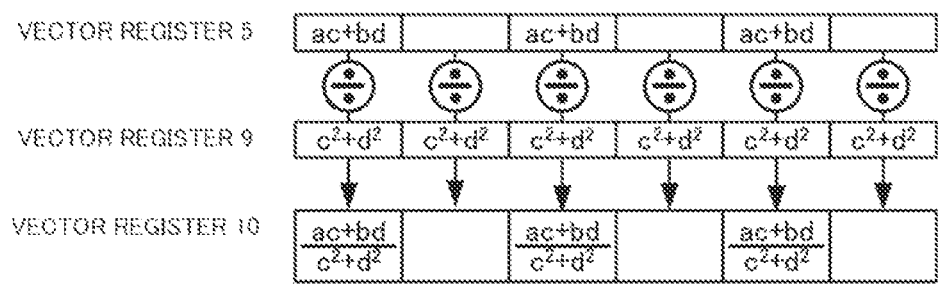

Fig.29
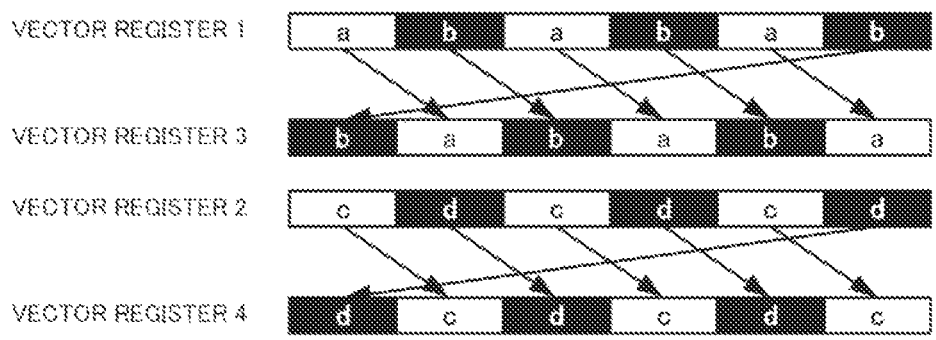
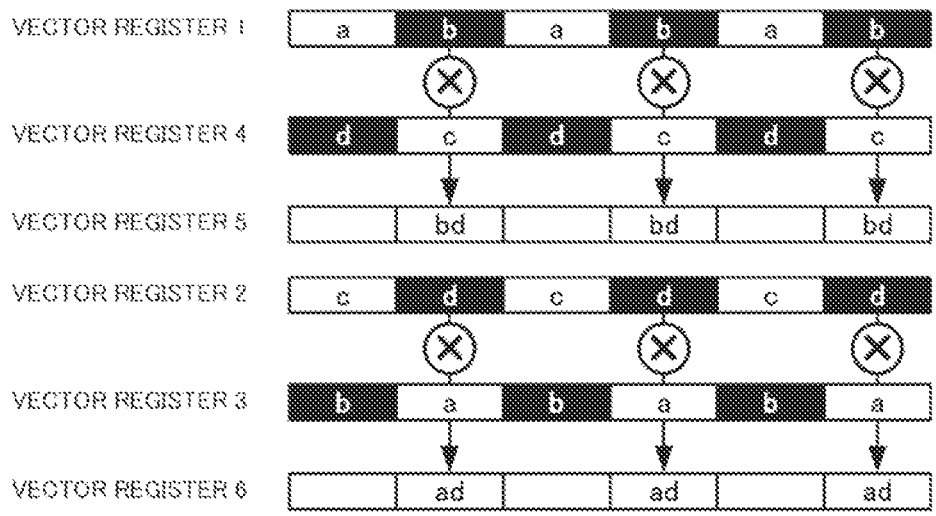
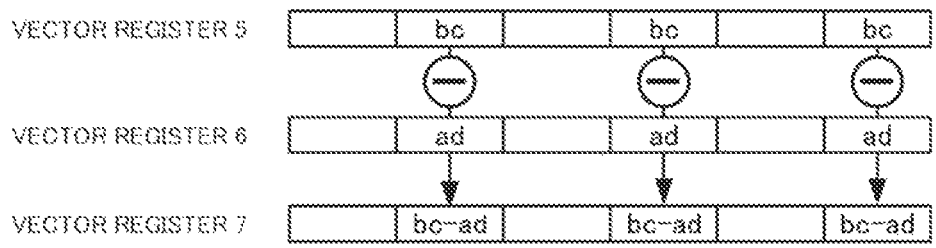
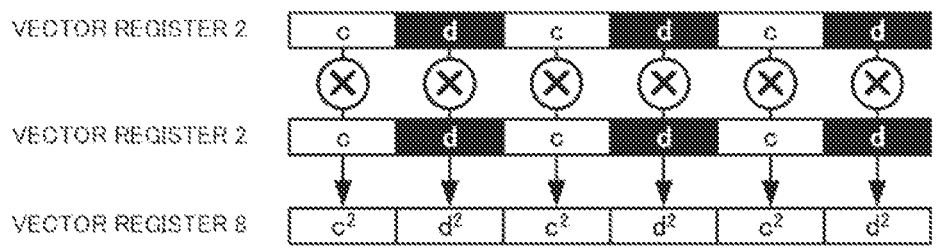

Fig.30
5. TRANSFER ELEMENTS BY VECTOR TRANSFER INSTRUCTION
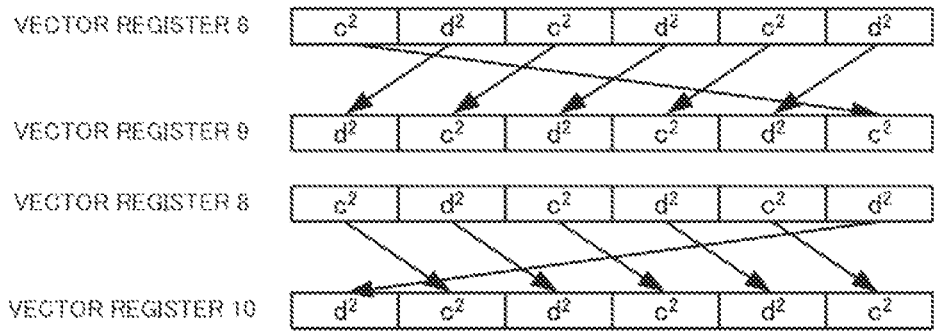
6. PERFORM ADDITION OF SQUARE OF REAL PART AND SQUARE OF IMAGINARY PART BY MASKED VECTOR ADDITION
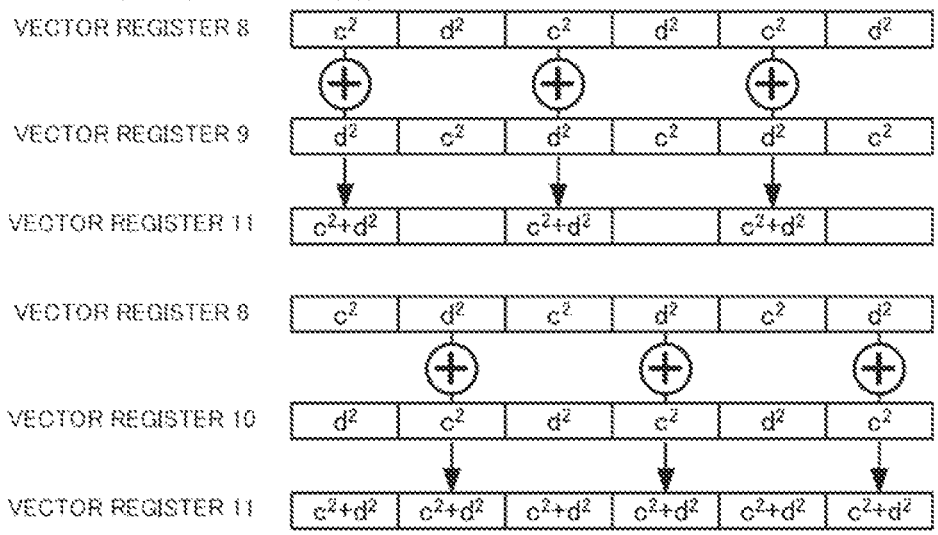
7. PERFORM DIVISION BY MASKED VECTOR DIVISION
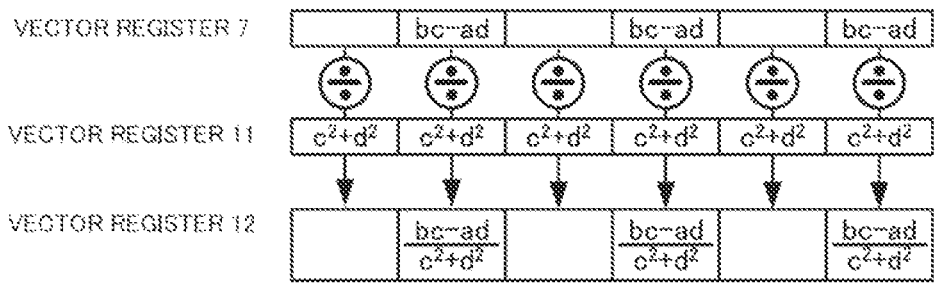

INFORMATION PROCESSING APPARATUS, INFORMATION PROCESSING METHOD, AND PROGRAM

This application is a National Stage Entry of PCT/JP2019/032671 filed on Aug. 21, 2019, which claims priority from Japanese Patent Application 2018-178791 filed on Sep. 25, 2018, the contents of all of which are incorporated herein by reference, in their entirety.

TECHNICAL FIELD

The present invention relates to an information processing apparatus which generates a complex vector operation instruction, an information processing method, and a program.

BACKGROUND ART

In executing the four operations including the addition, subtraction, multiplication and division of complex data by vector operations, it is general to load real-part data and imaginary-part data alternately aligning in a memory into different vector registers 1 and 2, respectively, as shown in FIG. 1. This is because in the multiplication and division of complex numbers, as shown by equations of FIG. 8, it is necessary to multiply the real parts and the imaginary parts of two complex numbers at the time of calculation of the imaginary parts, and it is necessary to separate the vector registers.

Patent Document 1: Japanese Unexamined Patent Application Publication No. JP-A 2005-174295

Since the real-part data and the imaginary-part data are arranged so as to alternately align in the memory as mentioned above, it is necessary to access by not continuous access but stride access when storing the data into the vector registers by vector loading. Stride access is not reading data continuously, but reading data at regular intervals as shown in FIG. 2. However, stride access has a problem that it is slower than continuous access. Then, vector storing to retrieve the operation result from the vector register to the memory is also performed by stride access, which causes a problem of low speed.

Regarding the technique described in Patent Document 1, a case where the multiplication of complex data is performed without loading real-part data and imaginary-part data into different vector registers is illustrated as an example. Meanwhile, the technique described in the document is premised on issuing an instruction specialized for the multiplication of complex data in advance, and causes a problem that other vector operations of complex data, specifically, the division of complex data cannot be executed by a vector operation.

SUMMARY

Accordingly, an object of the present invention is to provide an information processing apparatus which can solve the problem that a vector operation of complex data becomes slower and a vector operation cannot be executed, an information processing method, and a program.

An information processing apparatus according to an aspect of the present invention includes: a load instruction generating unit configured to generate an instruction to continuously access a memory in which a real part and an imaginary part composing complex data are alternately arranged, in accordance with arrangement of the real part and the imaginary part, and load the real part and the imaginary part as respective elements of a vector register; and an operation instruction generating unit configured to generate a vector operation instruction including an instruction to perform a vector operation of elements corresponding to element numbers different from each other between two vector registers and an instruction to perform a masked vector operation.

Further, an information processing method according to another aspect of the present invention includes: generating an instruction to continuously access a memory in which a real part and an imaginary part composing complex data are alternately arranged, in accordance with arrangement of the real part and the imaginary part, and load the real part and the imaginary part as respective elements of a vector register; and generating a vector operation instruction including an instruction to perform a vector operation of elements corresponding to element numbers different from each other between two vector registers and an instruction to perform a masked vector operation.

Further, a computer program according to another aspect of the present invention includes instructions for causing an information processing apparatus to realize: a load instruction generating unit configured to generate an instruction to continuously access a memory in which a real part and an imaginary part composing complex data are alternately arranged, in accordance with arrangement of the real part and the imaginary part, and load the real part and the imaginary part as respective elements of a vector register; and an operation instruction generating unit configured to generate a vector operation instruction including an instruction to perform a vector operation of elements corresponding to element numbers different from each other between two vector registers and an instruction to perform a masked vector operation.

Further, a vector processing apparatus according to another aspect of the present invention is configured to execute processing of: continuously accessing a memory in which a real part and an imaginary part composing complex data are alternately arranged, in accordance with arrangement of the real part and the imaginary part, and loading the real part and the imaginary part as respective elements of a vector register; and executing a vector operation including a vector operation of elements corresponding to element numbers different from each other between two vector registers and a masked vector operation.

Further, an information processing method according to another aspect of the present invention is an information processing method by a vector processing apparatus. The method includes: continuously accessing a memory in which a real part and an imaginary part composing complex data are alternately arranged, in accordance with arrangement of the real part and the imaginary part, and loading the real part and the imaginary part as respective elements of a vector register; and executing a vector operation including a vector operation of elements corresponding to element numbers different from each other between two vector registers and a masked vector operation.

With the configurations as described above, the present invention makes it possible to perform every operation in complex data vector operations at high speeds.

BRIEF DESCRIPTION OF DRAWINGS

FIG. 8 is a view showing an operation equation of complex numbers that are target of generation of a vector operation instruction in the first example embodiment of the present invention;

FIG. 9 is a view showing a source program of the addition of complex numbers disclosed in FIG. 8;

FIG. 10 is a view showing a source program of the subtraction of complex numbers disclosed in FIG. 8;

FIG. 11 is a view showing a source program of the multiplication of complex numbers disclosed in FIG. 8;

FIG. 12 is a view showing a source program of the division of complex numbers disclosed in FIG. 8;

FIG. 16 is a view showing an example of a vector operation instruction generated based on the source program of the multiplication of complex numbers disclosed in FIG. 11;

FIG. 18 is a view showing a procedure of the vector operation instruction in the multiplication of complex numbers disclosed in FIG. 16 and a vector register image;

FIG. 19 is a view showing a procedure of the vector operation instruction in the multiplication of complex numbers disclosed in FIG. 16 and a vector register image;

FIG. 20 is a view showing a procedure of the vector operation instruction in the division of complex numbers disclosed in FIG. 17 and a vector register image;

FIG. 21 is a view showing a procedure of the vector operation instruction in the division of complex numbers disclosed in FIG. 17 and a vector register image;

FIG. 23 is a view showing an example of a vector operation instruction generated based on a source program of the multiplication of complex numbers in the second example embodiment of the present invention;

FIG. 25 is a view showing a procedure of the vector operation instruction in the multiplication of complex numbers disclosed in FIG. 23 and a vector register image;

FIG. 26 is a view showing a procedure of the vector operation instruction in the multiplication of complex numbers disclosed in FIG. 23 and a vector register image;

FIG. 27 is a view showing a procedure of the vector operation instruction in the division of complex numbers disclosed in FIG. 24 and a vector register image;

FIG. 28 is a view showing a procedure of the vector operation instruction in the division of complex numbers disclosed in FIG. 24 and a vector register image;

FIG. 29 is a view showing a procedure of the vector operation instruction in the division of complex numbers disclosed in FIG. 24 and a vector register image;

FIG. 30 is a view showing a procedure of the vector operation instruction in the division of complex numbers disclosed in FIG. 24 and a vector register image.

EXAMPLE EMBODIMENTS

First Example Embodiment

Figure 1:
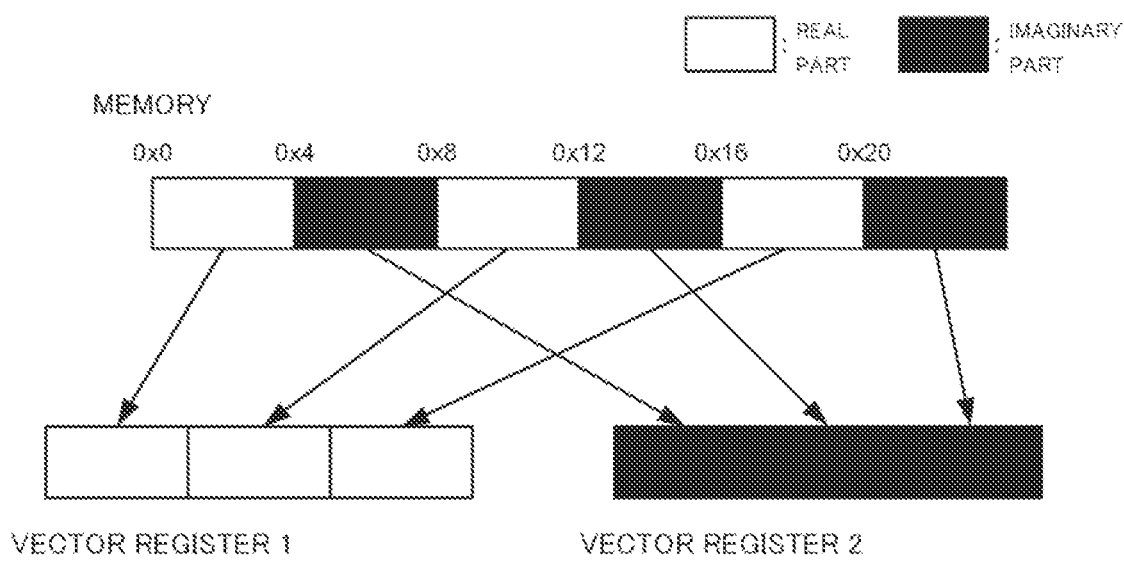
FIG. 1 is a view for describing a background art of the present invention.
Figure 2:
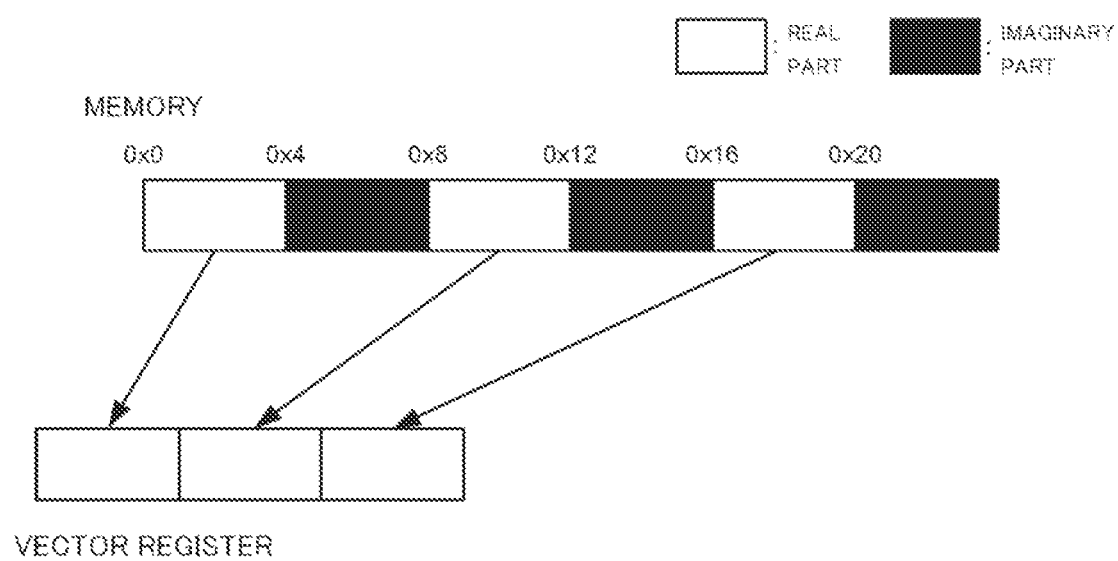
FIG. 2 is a view for describing the background art of the present invention.
Figure 3:
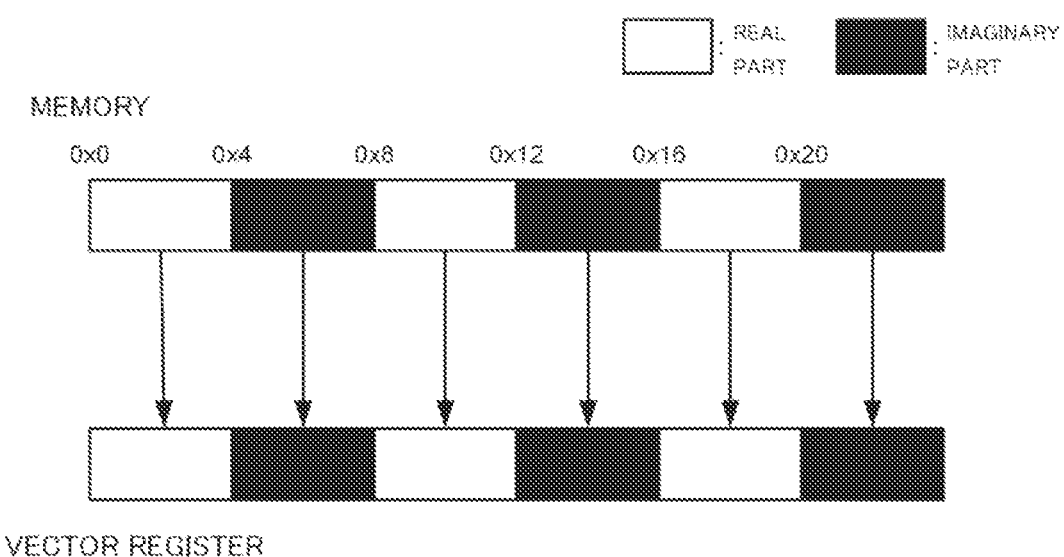
FIG. 3 is a view for describing the overview of the present invention.
Figure 4:
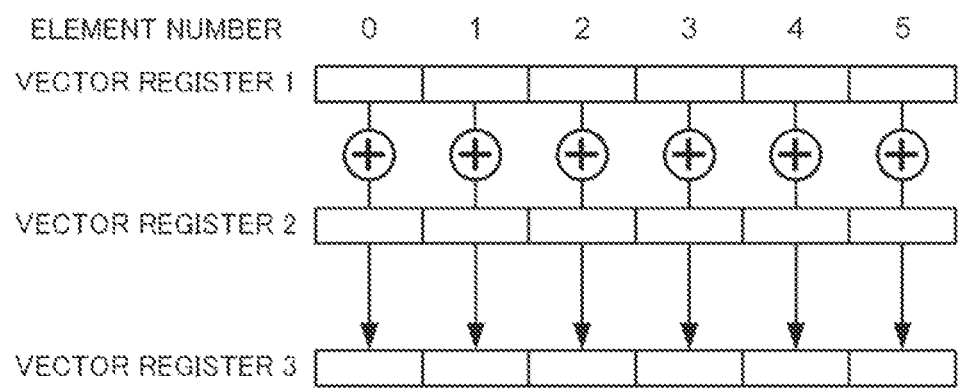
FIG. 4 is a view for describing the overview of the present invention.
Figure 5:
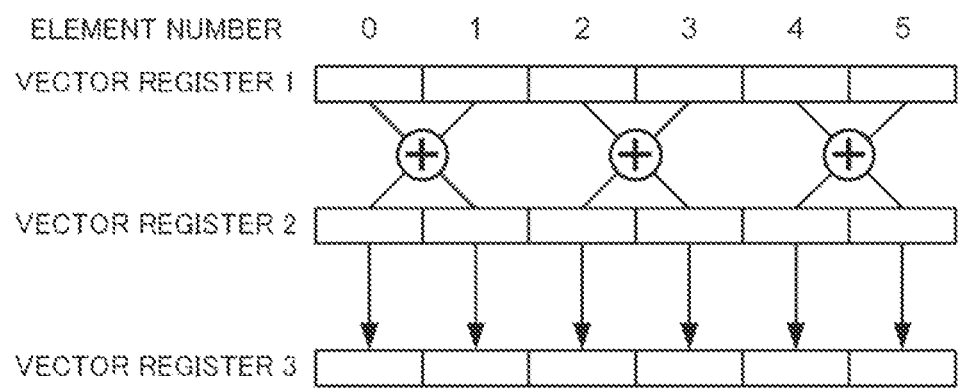
FIG. 5 is a view for describing the overview of the present invention.
Figure 6:
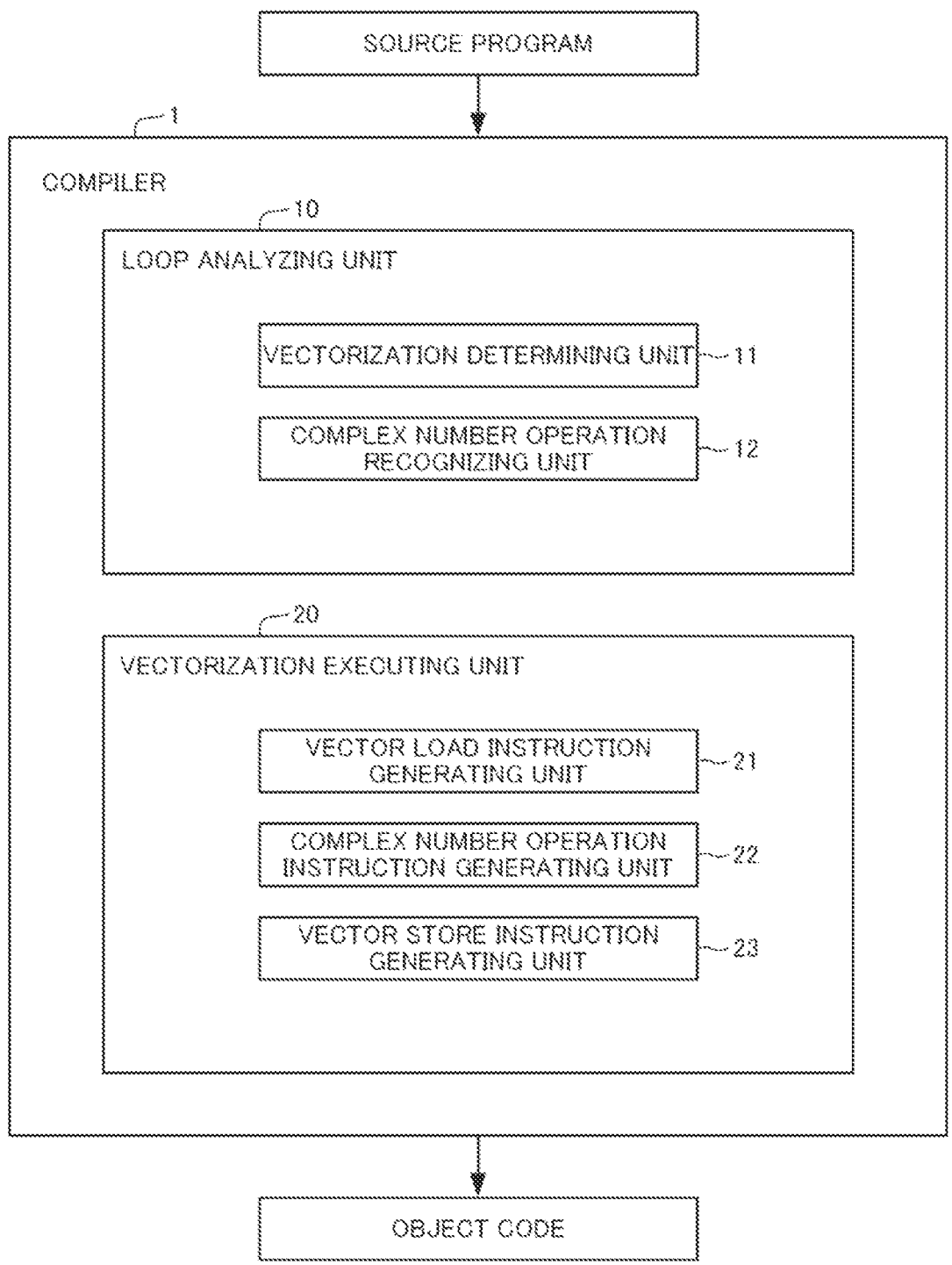
FIG. 6 is a block diagram showing a configuration of a compiler in a first example embodiment of the present invention.

A first example embodiment of the present invention will be described with reference to FIGS. 3 to 21. FIGS. 3 to 5 are views for describing the overview of the present invention. FIG. 6 is a view for describing a configuration of the present invention, and FIGS. 7 to 21 are views for describing an operation of the present invention.

[Overview]

First, the overview of the present invention will be described. The present invention relates to an information processing apparatus that generates a complex data vector operation instruction for a vector processing apparatus. Specifically, the information processing apparatus has a function as a compiler that generates an instruction to perform the four operations of complex data.

To be specific, according to the present invention, at the time of performing vector loading of complex data from a memory to a vector register, memory access is speeded up by continuous access instead of stride access. Likewise, at the time of performing vector storing from the vector register to the memory, memory access is speeded up by continuous access. Due to continuous access instead of stride access, the vector register is not separated for real parts and imaginary parts of complex data and, as shown in FIG. 3, elements are stored in the vector register with the real parts and the imaginary parts next to each other.

Further, in the case of a normal vector four operation instruction, as shown in FIG. 4, the operation is for the same element numbers. Therefore, in the multiplication and division of complex numbers, an operation of a real part and an imaginary part is impossible in the vector register with the real parts and the imaginary parts next to each other because the element numbers of the real parts and the imaginary parts are different. Then, the present invention enables an operation of a real part and an imaginary part by using a masked vector cross operation instruction as shown in FIG. 5 in an operation for different element numbers. Also, a masked vector cross operation is used for the addition and subtraction of the multiplication result of real parts and the multiplication result of imaginary parts in the multiplication and division of complex numbers. Combination of continuous access to complex data and a masked vector operation enables acceleration of memory access while keeping the four operations of complex data enabled.

[Configuration]

Next, a configuration of a compiler 1 in the example embodiment of the present invention will be described. The compiler 1 is configured by a general information processing apparatus including an arithmetic logic unit and a storage unit, and is structured by execution of a compiler program by the arithmetic logic unit. As shown in FIG. 6, the compiler 1 includes a loop analyzing unit 10 and a vectorization executing unit 20.

The loop analyzing unit 10 analyzes an operation target program and analyzes whether a loop in the program can be vectorized and the loop includes an operation of complex numbers. To be specific, as shown in FIG. 6, the loop analyzing unit 10 includes a vectorization determining unit 11 that determines whether the detected loop is vectorizable, and a complex number operation recognizing unit 12 that recognizes whether the vectorizable loop includes an operation of complex numbers.

The vectorization executing unit 20 vectorizes the loop based on the result of analysis by the loop analyzing unit 10. To be specific, as shown in FIG. 6, the vectorization executing unit 20 includes a continuous access vector load instruction generating unit 21 that generates an instruction for loading complex data stored in the memory to the vector register by continuous access, a complex number operation instruction generating unit 22 that generates an instruction for executing an operation of complex numbers, and a continuous access vector store instruction generating unit 23 that generates an instruction for writing the result of the operation of complex numbers from the vector register into the memory by continuous access. The detailed functions of the respective units included by the abovementioned compiler 1 will be described in the description of an operation as follows.

Figure 7:
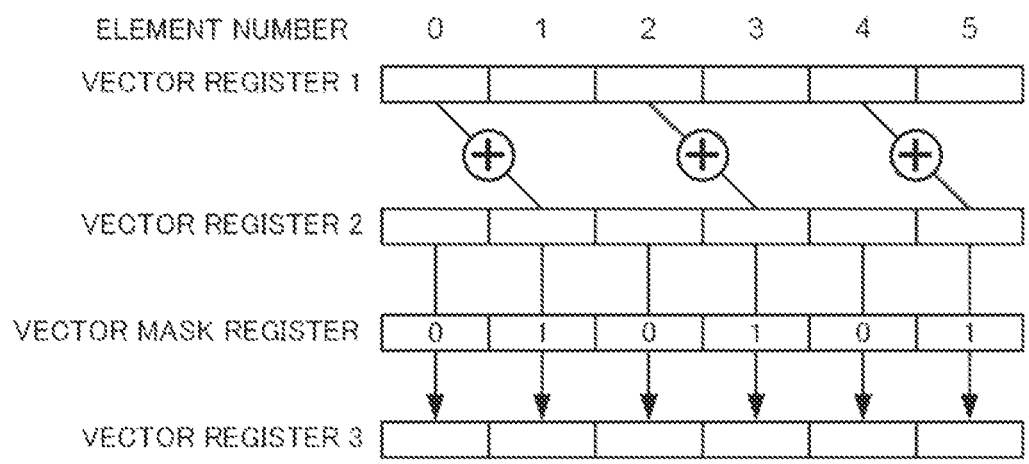
FIG. 7 is a view for describing a vector operation instruction generated in the first example embodiment of the present invention.

Further, the present invention provides a vector processing apparatus (not shown in the drawing) that performs a vector operation in accordance with a vector operation instruction generated by the abovementioned compiler 1. To be specific, in order to execute the addition, subtraction, multiplication and division of complex numbers, the vector processing apparatus includes a function to execute a masked vector cross operation in addition to a general masked vector instruction. A masked vector cross operation instruction is, as described before, an instruction to execute an operation on different element numbers as shown in FIG. 5, and the result on only an element number whose element is 1 of a designated vector mask register is stored. As an example, in a masked vector cross operation as shown in FIG. 7, a vector mask register has "010101", so that only operations on element numbers 1, 3 and 5 of a writing destination vector register 3 are executed and the calculation results are stored. Since a vector mask register used in the present invention has a limited element pattern, the vector mask register is included as a special register in the vector processing apparatus. If the vector mask register is not included in the vector processing apparatus, there is a need to generate it together with a mask operation instruction.

[Operation]

Figure 13:
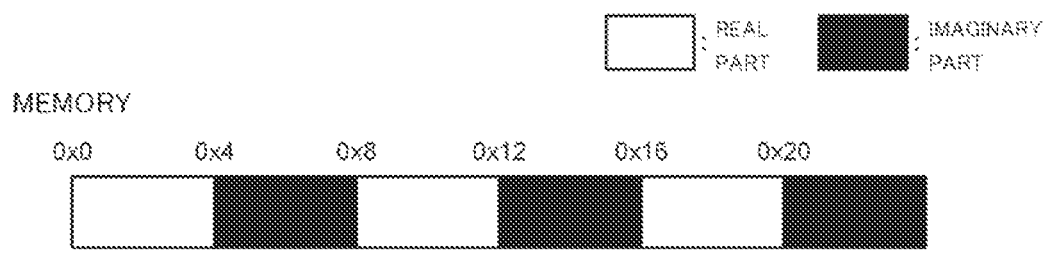
FIG. 13 is a view showing a configuration of a memory in the first example embodiment of the present invention.

Next, an operation of the abovementioned compiler 1 will be described with reference to FIGS. 8 to 21. In this example embodiment, a vector operation instruction to execute the addition, subtraction, multiplication and division of complex numbers shown by equations in FIG. 8 is generated. To be specific, a vector operation instruction is generated based on a Fortran program code having a loop operation on an array of a real part and an imaginary part in the addition, subtraction, multiplication and division of complex numbers shown in FIGS. 9 to 12, respectively. In the array of complex numbers included in the Fortran program shown in each of FIGS. 9 to 12, one element is 8 bytes, and one element of a real part and one element of an imaginary part are 4 bytes each. In the Fortran language, the language specification stipulates that complex data is stored in a memory in a manner that real parts and imaginary parts are alternately placed next to each other, so that the real parts and the imaginary parts composing the complex data are stored in the memory as shown in FIG. 13.

First, the vectorization determining unit 11 determines whether loop operations as shown by the program codes of FIGS. 9 to 12 are vectorizable. A condition that a loop operation is vectorizable is that there is no dependency that hinders vectorization in the definition/reference relationship of arrays and variables. Then, a loop including a complex number operation is detected from among the loops determined to be vectorizable by the complex number operation recognizing unit 12.

Subsequently, the loop that is vectorizable and includes the operation of complex numbers as mentioned above is vectorized by the vectorization executing unit 20. Herein, as shown in FIGS. 14 to 17, instruction sequences are generated from the program sources of FIGS. 9 to 12.

To be specific, first, the continuous access vector load instruction generating unit 21 (a load instruction generating unit) generates a vector load instruction to load complex number arrays A and B from the memory to the vector register. At this time, the vector load instruction is to load data in units of 4 bytes, set a loading interval designated by a second operand of the vector load instruction to 4 bytes, and thereby make access to the memory to be continuous access in order of the placement. As a result, as shown in FIG. 3, the data is stored into the respective consecutive elements of the vector register in a state where the real parts and the imaginary parts of the complex number data are next to each other.

Next, after the instruction to store the data into the vector register by vector loading is generated, the complex number operation instruction generating unit 22 (an operation instruction generating unit) generates an instruction to execute a complex number operation. Here, an example of generation of the instruction in each of the four operations of complex numbers will be described.

Figure 14:
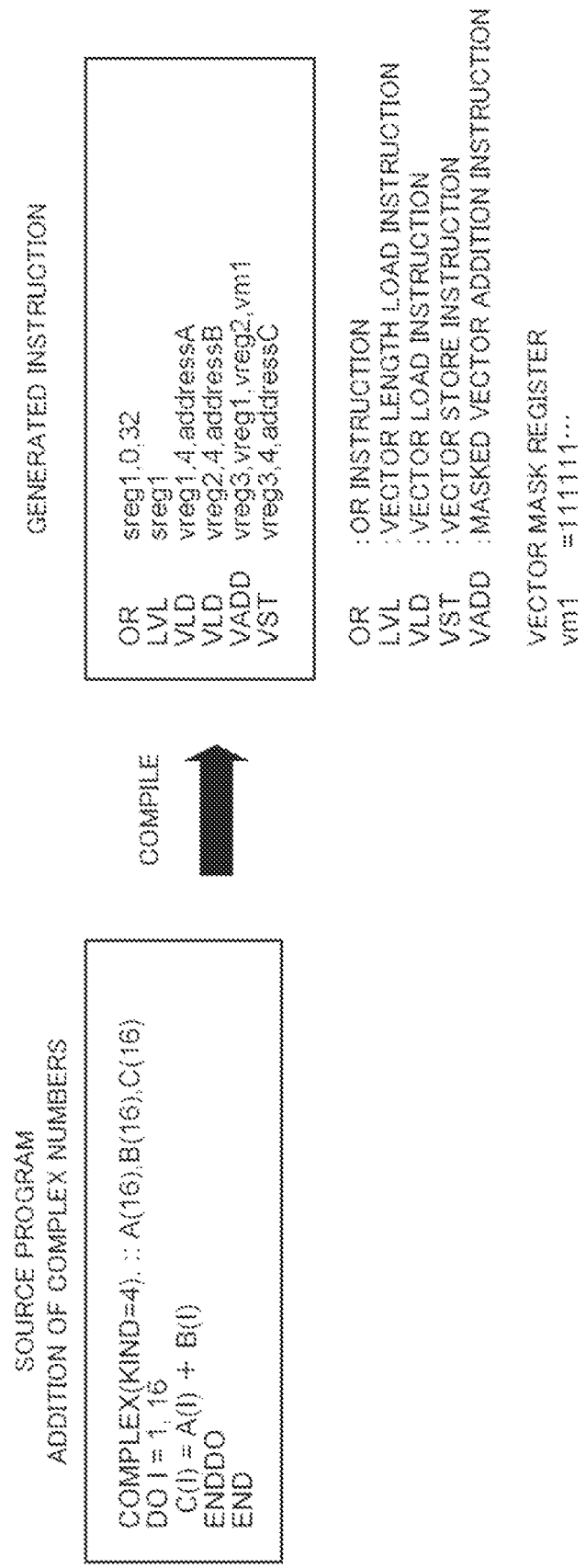
FIG. 14 is a view showing an example of a vector operation instruction generated based on the source program of the addition of complex numbers disclosed in FIG. 9.
Figure 15:
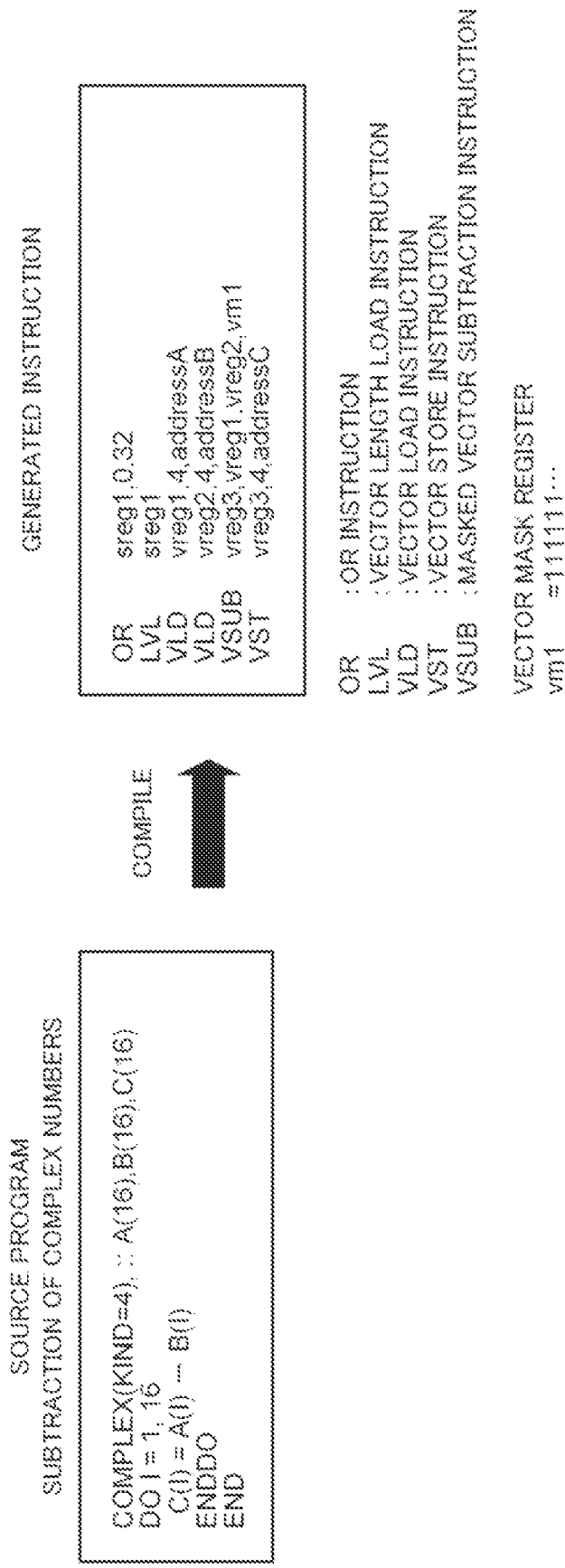
FIG. 15 is a view showing an example of a vector operation instruction generated based on the source program of the subtraction of complex numbers disclosed in FIG. 10.

Since addition and subtraction between real parts and addition and subtraction between imaginary parts are performed in the addition and subtraction of complex numbers as shown by the equations of FIG. 8, calculation can be performed by a vector operation on the same element numbers between vector registers as shown in FIG. 4. Therefore, as shown in FIGS. 14 and 15, in the addition and subtraction of complex numbers, a masked vector addition instruction and a masked vector subtraction instruction are generated. At this time, all the elements of a designated vector mask register are "1". Hereinafter, unless otherwise specified for a vector mask register, it is assumed that a mask with all the elements "1" is designated.

Next, the multiplication of complex numbers will be described. As shown by the equation of FIG. 8, in the multiplication of complex numbers, a calculation method for real parts is different from that for imaginary parts. For the multiplication of the real parts of complex numbers, multiplication of the real parts and multiplication of the imaginary parts are executed, respectively, and thereafter, the multiplication result of the imaginary parts is subtracted from the multiplication result of the real parts. For this, as shown in FIG. 16, in order to execute the multiplication of the real parts and the multiplication of the imaginary parts, a masked vector multiplication instruction is generated. Then, in order to subtract the multiplication result of the imaginary parts from the multiplication result of the real parts, a masked vector sign inversion instruction and a masked vector cross subtraction instruction are generated. At this time, the masked vector cross subtraction instruction designates a vector mask register repeating "10" from the first element, and the results are stored only in the elements of the real parts. A procedure of the multiplication of the real parts and a vector register image are shown in FIG. 18.

For the multiplication of the imaginary parts of complex numbers, as shown by the equation of FIG. 8, the multiplication of the real parts and the multiplication of the imaginary parts are executed, and thereafter, the multiplication result of the real parts and the multiplication result of the imaginary parts are added. For this, as shown in FIG. 16, in order to execute the multiplication of the real parts and the multiplication of the imaginary parts, a masked vector cross multiplication instruction is generated. Then, in order to add the multiplication result of the real parts and the multiplication result of the imaginary parts placed next to each other, a masked vector cross addition instruction is generated. At this time, the masked vector cross addition instruction designates a vector mask register repeating "01" from the first element, and the results are stored only in the elements of the imaginary parts. A procedure of the multiplication of imaginary parts and a vector register image are shown in FIG. 19.

Next, the division of complex numbers will be described. As shown by the equation of FIG. 8, in the division of complex numbers, a calculation method for real parts is different from that for imaginary parts. Meanwhile, the calculation of numerators is the same as in the multiplication except that addition and subtraction are interchanged.

Figure 17:
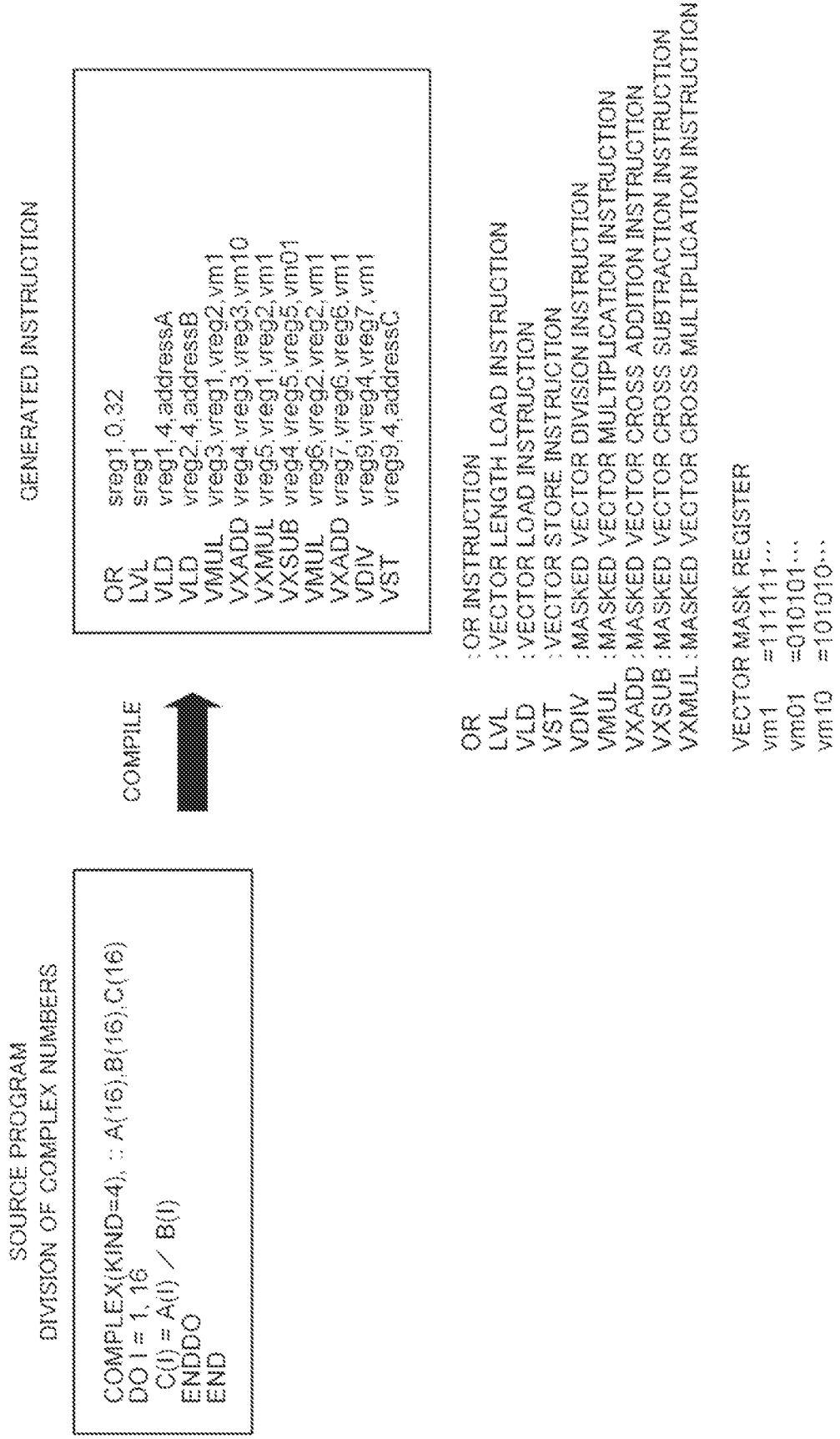
FIG. 17 is a view showing an example of a vector operation instruction generated based on the source program of the division of complex numbers disclosed in FIG. 12.

In the division of the real parts of complex numbers, as shown by the equation of FIG. 8, after the multiplication of the real parts and the multiplication of the imaginary parts are executed, the two multiplication results are added, and the result of the addition is divided by a value obtained by adding the square of the real part of the denominator and the square of the imaginary part of the denominator. For this, as shown in FIG. 17, in order to execute the multiplication of the real parts and the multiplication of the imaginary parts, a masked vector multiplication instruction is generated. Then, in order to add the multiplication result of the real parts and the multiplication result of the imaginary parts, a masked vector cross addition instruction is generated. At this time, the masked vector cross addition instruction designates a vector mask register repeating "10" from the first element, and the results are stored only in the elements of the real parts.

Since an operation instruction of the calculation of the denominator and the division by the calculated denominator is the same processing as the division of the imaginary parts of the complex numbers, the operation instruction is generated after an operation instruction to calculate the numerator of the imaginary part is generated. After the operation instruction to calculate the numerator of the imaginary part is generated, a masked vector multiplication instruction for squaring the real part and the imaginary part is generated. Then, a masked vector cross addition instruction is generated in order to add the square of the real part and the square of the imaginary part. Finally, a masked vector division instruction is generated in order to perform the division. A procedure of the division of the real parts and a vector register image are shown in FIG. 20.

In the division of imaginary parts of complex numbers, as shown by the equation of FIG. 8, after the multiplication of the real parts and the multiplication of the imaginary parts are executed, one multiplication result is subtracted from the other multiplication result, and the result of the subtraction is divided by a value obtained by adding the square of the real part of the denominator and the square of the imaginary part of the denominator. For this, as shown in FIG. 17, in order to execute the multiplication of the real parts and the multiplication of the imaginary parts, a masked vector cross multiplication instruction is generated. Then, in order to perform subtraction of the multiplication result of the real parts and the multiplication result of the imaginary parts next to each other, a masked vector cross subtraction instruction is generated. At this time, the masked vector cross subtraction instruction designates a vector mask register repeating "01" from the first element, and the results are stored only in the elements of the imaginary parts. After that, as described in the procedure of generation of the instruction to perform the division of the real parts of the complex numbers, an operation instruction for calculating the denominator and an operation instruction for executing the division are generated. A procedure of the division of the imaginary parts and a vector register image are shown in FIG. 21.

As mentioned before, after the complex number operation instruction generating unit 22 generates an instruction to execute a complex number operation, the continuous access vector store instruction generating unit 23 (a vector store instruction generating unit) generates a vector store instruction to write a complex number array C that is the result of the complex number operation from the vector register into the memory. At this time, as with the vector load instruction, the vector store instruction is to store data in units of 4 bytes, set a storing interval designated by a second operand of the vector store instruction to 4 bytes, and thereby make access to the respective consecutive elements of the vector register to be continuous access.

Although the programs shown in FIGS. 9 to 12 each contain only a single operation, the present invention can be applied to a case where the loop contains a plurality of operations and a case where the four operations are combined. This is because the operation result is stored in the vector register so that real parts and imaginary parts are next to each other and therefore the arrangement of the real parts and the imaginary parts is the same as the arrangement in vector loading. Moreover, although one element of a complex number array is 8 bytes in FIGS. 9 to 12, the present invention can be applied even when the precision (size) is different as long as the vector processing apparatus has instructions with the different precision.

Thus, according to the present invention, at the time of performing vector loading of complex data from a memory to a vector register, memory access is speeded up by continuous access instead of stride access of the background technique. Likewise, at the time of performing vector storing from the vector register to the memory, memory access can be speeded up. Moreover, a vector length when executing a vector operation is two times the arrangement length of complex data, and the number of elements that can be consecutively processed increases. Therefore, it is possible to increase the processing efficiency in a case where the arrangement length of complex data is shorter than the maximum vector length of the computer.

Further, according to the present invention, in an operation on different elements numbers between vector registers, an operation of a real part and an imaginary part is enabled by the use of a masked vector cross operation instruction. Consequently, the four operations of complex data are enabled.

Although a case of performing a vector cross operation of elements corresponding to element numbers different from each other by one between vector registers is illustrated as an example above, element numbers on which a cross operation is performed are not necessarily limited to being different by one, and may be different by any number.

Second Example Embodiment

Next, a second example embodiment of the present invention will be described with reference to FIGS. 22 to 30. In this example embodiment, a case where the vector processing apparatus does not have a function to execute a masked vector cross operation instruction described in the first example embodiment will be described.

Figure 22:
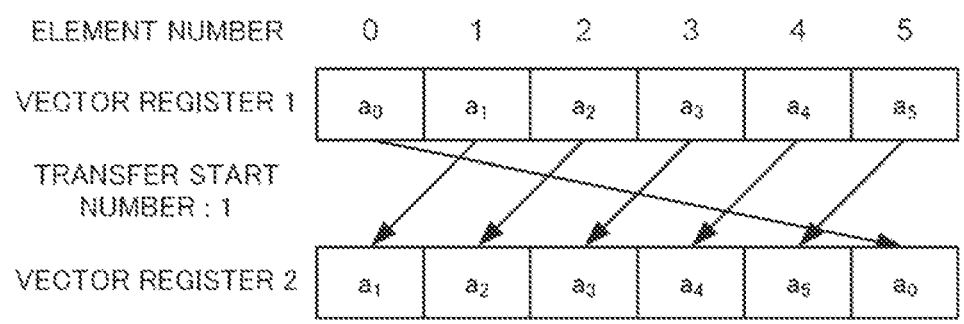
FIG. 22 is a view for describing a vector operation instruction generated in a second example embodiment of the present invention.

In this example embodiment, as will be described below, the use of a vector transfer instruction and a masked vector operation makes it possible to execute the same processing as a masked vector cross operation instruction. As shown in FIG. 22, a vector transfer instruction is to, with a value designated by a scalar register as a transfer start number, store the vector elements of a vector register from which the elements are loaded, in order from the beginning of a vector register into which the elements are written. In a case where the length of element numbers is equal to or more than a vector length, the number returns to 0. That is to say, in the example of FIG. 22, the vector transfer instruction is to transfer the respective elements of a vector register to a new vector register in which element numbers shifted by at least one from those of the respective elements correspond to new element numbers. The number of elements to be shifted by the vector transfer instruction is not limited to one, and may be any number.

To be specific, the complex number operation instruction generating unit 22 in this example embodiment generates the abovementioned vector transfer instruction as will be described below. Because the operation is the same as in the former example embodiment except the multiplication and division of complex numbers, a difference from the first example embodiment will be mainly described below.

In the multiplication of the real parts of complex numbers, the complex number operation instruction generating unit 22 generates an instruction as shown in FIG. 23. In the example of FIG. 23, a masked vector multiplication instruction is generated in order to execute the multiplication of the real parts and the multiplication of the imaginary parts. Then, in order to subtract the multiplication result of the imaginary parts from the multiplication result of the real parts, a vector transfer instruction and a masked vector subtraction instruction are generated. The transfer start number of the vector transfer instruction is "1". As the vector mask register of the masked vector subtraction instruction, a vector mask register repeating "10" from the first element is designated, and the results are stored only in the elements of the real parts. A procedure of the multiplication of the real parts and a vector register image are shown in FIG. 25.

In the multiplication of the imaginary parts of complex numbers, the complex number operation instruction generating unit 22 generates an instruction as shown in FIG. 23. In FIG. 23, in order to execute the multiplication of the real parts and the multiplication of the imaginary parts, a vector transfer instruction and a masked vector multiplication instruction are generated. As the transfer start numbers of the two vector transfer instructions, a vector length "−1" is designated. For the two masked vector multiplication instructions, vector mask registers each repeating "01" from the first element are designated. Then, in order to add the multiplication result of the real parts and the multiplication result of the imaginary parts, a masked vector addition instruction is generated. At this time, for the masked vector addition instruction, a vector mask register repeating "01" from the first element is designated, and the results are stored only in the elements of the imaginary parts. A procedure of the multiplication of the imaginary parts and a vector register image are shown in FIG. 26.

Figure 24:
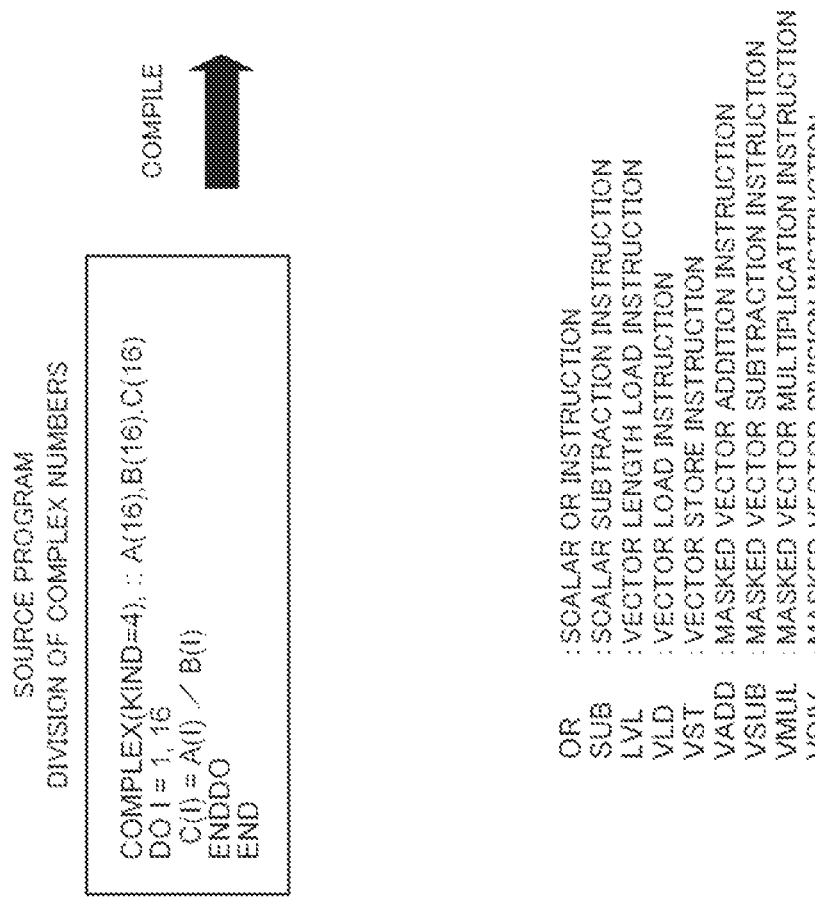
FIG. 24 is a view showing an example of a vector operation instruction generated based on a source program of the division of complex numbers in the second example embodiment of the present invention.

In the division of the real parts of complex numbers, the complex number operation instruction generating unit 22 generates an instruction as shown in 24. In FIG. 24, in order to execute the multiplication of the real parts and the multiplication of the imaginary parts, a masked vector multiplication instruction is generated. Then, in order to add the multiplication result of the real parts and the multiplication result of the imaginary parts, a vector transfer instruction and a masked vector addition instruction are generated. The transfer start number of the vector transfer instruction is "1". For the masked vector addition instruction, a vector mask register repeating "10" from the first element is designated, and the results are stored only in the elements of the real parts.

Since an operation instruction of the calculation of the denominator and the division by the calculated denominator is the same processing as the division of the imaginary parts of complex numbers, the operation instruction is generated after an operation instruction to calculate the numerator of the imaginary part is generated. After the operation instruction to calculate the numerator of the imaginary part is generated, a masked vector multiplication instruction for squaring the real part and the imaginary part is generated. Then, a vector transfer instruction and a masked vector addition instruction are generated in order to add the square of the real part and the square of the imaginary part. As the transfer start numbers of the two vector transfer instructions, "1" and a vector length "−1" are designated. For the two masked vector addition instructions, a vector mask register repeating "10" from the first element and a vector mask register repeating "01" are designated. Finally, a masked vector division instruction is generated in order to perform the division. A procedure of the division of the real parts and a vector register image are shown in FIGS. 27 and 28.

In the division of the imaginary parts of complex numbers, the complex number operation instruction generating unit 22 generates an instruction as shown in FIG. 24. In FIG. 24, in order to execute the multiplication of the real parts and the multiplication of the imaginary parts, a vector transfer instruction and a masked vector multiplication instruction are generated. As the transfer start numbers of the two vector transfer instructions, a vector length "−1" is designated. For the two masked vector multiplication instructions, a vector mask register repeating "01" from the first element is designated. Then, in order to perform subtraction of the multiplication result of the real parts and the multiplication result of the imaginary parts, a masked vector subtraction instruction is generated. At this time, for the masked vector subtraction instruction, a vector mask register repeating "01" from the first element is designated, and the results are stored only in the elements of the imaginary parts. After that, as described in the procedure of generation of the instruction to perform the division of the real parts of the complex numbers, an operation instruction for calculating the denominator and an operation instruction for executing the division are generated. A procedure of the division of the imaginary parts and a vector register image are shown in FIGS. 29 and 30.

Third Example Embodiment

Figure 31:
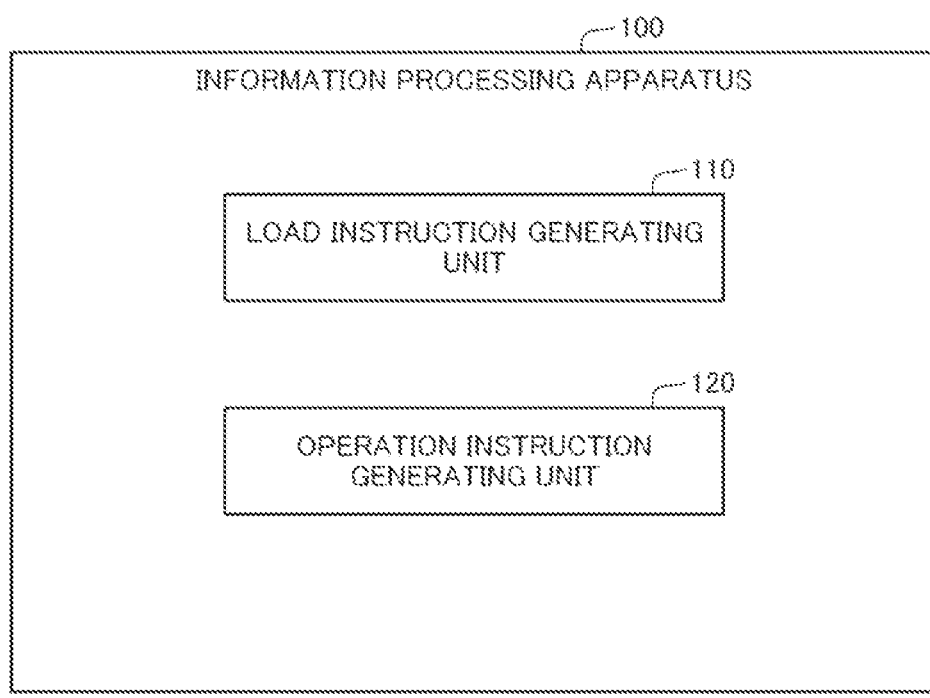
FIG. 31 is a block diagram showing a configuration of a processor in a third example embodiment of the present invention.

Next, a third example embodiment of the present invention will be described with reference to FIG. 31. FIG. 31 is a block diagram showing a configuration of the information processing apparatus (compiler) in the first and second example embodiments. In this example embodiment, the overview of the configuration of the information processing apparatus described in the first and second example embodiments is illustrated.

As shown in FIG. 31, an information processing apparatus 100 in this example embodiment includes: a load instruction generating unit 110 configured to generate an instruction to continuously access a memory in which a real part and an imaginary part composing complex data are alternately arranged in accordance with arrangement of the real part and the imaginary part, and load the real part and the imaginary part as elements of a vector register; and an operation instruction generating unit 120 configured to generate a vector operation instruction including an instruction to perform a vector operation of elements corresponding to mutually different element numbers between the two vector registers and an instruction to perform a masked vector operation.

The load instruction generating unit 110 and the operation instruction generating unit 120 are realized by execution of a program by the information processing apparatus.

Then, the information processing apparatus 100 with the above configuration operates to execute processing of: generating an instruction to continuously access a memory in which a real part and an imaginary part composing complex data are alternately arranged in accordance with arrangement of the real part and the imaginary art, and load the real part and the imaginary part as elements of a vector register; and generating a vector operation instruction including an instruction to perform a vector operation of elements corresponding to mutually different element numbers between the two vector registers and an instruction to perform a masked vector operation.

Further, in accordance with the instruction generated by the information processing apparatus 100, a vector processing apparatus operates to execute processing of: continuously accessing a memory in which a real part and an imaginary part composing complex data are alternately arranged in accordance with arrangement of the real part and the imaginary art, and loading the real part and the imaginary part as elements of a vector register; and executing a vector operation including an instruction to perform a vector operation of elements corresponding to mutually different element numbers between the two vector registers and an instruction to perform a masked vector operation.

Thus, according to the present invention, in vector operations on complex data, continuous access at the time of vector loading and vector storing of the complex data can speed up the vector loading and the vector storing. Moreover, the use of a masked vector cross operation at the time of executing the multiplication and division of complex numbers allows every operation on the complex numbers.

<Supplementary Notes>

The whole or part of the example embodiments disclosed above can be described as the following supplementary notes. Hereinafter, the overview of the configurations of the information processing apparatus, the information processing method, the program and the vector processing apparatus will be described. Meanwhile, the present invention is not limited to the following configurations.

(Supplementary Note 1)

An information processing apparatus comprising:
a load instruction generating unit configured to generate an instruction to continuously access a memory in which a real part and an imaginary part composing complex data are alternately arranged, in accordance with arrangement of the real part and the imaginary part, and load the real part and the imaginary part as respective elements of a vector register; and
an operation instruction generating unit configured to generate a vector operation instruction including an instruction to perform a vector operation of elements corresponding to element numbers different from each other between two vector registers and an instruction to perform a masked vector operation.

(Supplementary Note 2)

The information processing apparatus according to Supplementary Note 1, wherein the operation instruction generating unit is configured to generate a vector operation instruction including a masked vector cross operation instruction to perform a masked vector operation of elements corresponding to element numbers different from each other by one between the two vector registers.

(Supplementary Note 3)

The information processing apparatus according to Supplementary Note 2, wherein the operation instruction generating unit is configured to generate a vector operation instruction including the masked vector cross operation instruction to perform the masked vector operation between the two vector registers identical to or different from each other.

(Supplementary Note 4)

The information processing apparatus according to Supplementary Note 2 or 3, wherein the operation instruction generating unit is configured to generate a vector operation instruction including the masked vector cross operation instruction with a mask having element numbers spaced every other number.

(Supplementary Note 5)

The information processing apparatus according to Supplementary Note 1, wherein the operation instruction generating unit is configured to generate a vector transfer instruction to transfer respective elements of a predetermined vector register to a new vector register in which element numbers shifted by at least one from those of the respective elements correspond to new element numbers, and also generate an instruction to perform a masked vector operation on the vector registers including the new vector register.

(Supplementary Note 6)

The information processing apparatus according to any of Supplementary Notes 1 to 5, wherein the operation instruction generating unit is configured to generate the vector operation instruction based on a program code including a loop operation on an array of the real part and the imaginary part composing the complex data.

(Supplementary Note 7)

The information processing apparatus according to any of Supplementary Notes 1 to 6, comprising a vector store instruction generating unit configured to generate an instruction to continuously access respective elements of a vector register in which an operation result according to the generated vector operation instruction is stored, and write the operation result into the memory.

(Supplementary Note 8)

An information processing method comprising:
generating an instruction to continuously access a memory in which a real part and an imaginary part composing complex data are alternately arranged, in accordance with arrangement of the real part and the imaginary part, and load the real part and the imaginary part as respective elements of a vector register; and
generating a vector operation instruction including an instruction to perform a vector operation of elements corresponding to element numbers different from each other between two vector registers and an instruction to perform a masked vector operation.

(Supplementary Note 8.1)

The information processing method according to Supplementary Note 8, wherein a vector operation instruction is generated, the vector operating instruction including a masked vector cross operation instruction to perform a masked vector operation of elements corresponding to element numbers different from each other by one between the two vector registers.

(Supplementary Note 8.2)

The information processing method according to Supplementary Note 8, wherein a vector transfer instruction and an instruction are generated, the vector transfer instruction being to transfer respective elements of a predetermined vector register to a new vector register in which element numbers shifted by at least one from those of the respective elements correspond to new element numbers, the instruction being to perform a masked vector operation on the vector registers including the new vector register.

(Supplementary Note 8.3)

The information processing method according to any of Supplementary Notes 8 to 8.2, wherein the vector operation instruction is generated based on a program code including a loop operation on an array of the real part and the imaginary part composing the complex data.

(Supplementary Note 8.4)

The information processing method according to any of Supplementary Notes 8 to 8.3, comprising generating an instruction to continuously access respective elements of a vector register in which an operation result according to the generated vector operation instruction is stored and write the operation result into the memory.

(Supplementary Note 9)

A computer program comprising instructions for causing an information processing apparatus to realize:
a load instruction generating unit configured to generate an instruction to continuously access a memory in which a real part and an imaginary part composing complex data are alternately arranged, in accordance with arrangement of the real part and the imaginary part, and load the real part and the imaginary part as respective elements of a vector register; and
an operation instruction generating unit configured to generate a vector operation instruction including an instruction to perform a vector operation of elements corresponding to element numbers different from each other between two vector registers and an instruction to perform a masked vector operation.

(Supplementary Note 10)

A vector processing apparatus configured to execute processing of:
continuously accessing a memory in which a real part and an imaginary part composing complex data are alternately arranged, in accordance with arrangement of the real part and the imaginary part, and loading the real part and the imaginary part as respective elements of a vector register; and
executing a vector operation including a vector operation of elements corresponding to element numbers different from each other between two vector registers and a masked vector operation.

(Supplementary Note 10.1)

The vector processing apparatus according to Supplementary Note 10, wherein a masked vector cross operation is executed, the masked vector cross operating being to perform a masked vector operation of elements corresponding to element numbers different from each other by one between the two vector registers.

(Supplementary Note 10.2)

The vector processing apparatus according to Supplementary Note 10, wherein respective elements of a predetermined vector register are transferred to a new vector register in which element numbers shifted by at least one from those of the respective elements correspond to new element numbers, and a masked vector operation on the vector registers including the new vector register is executed.

(Supplementary Note 11)

An information processing method by a vector processing apparatus, the method comprising:
continuously accessing a memory in which a real part and an imaginary part composing complex data are alternately arranged, in accordance with arrangement of the real part and the imaginary part, and loading the real part and the imaginary part as respective elements of a vector register; and
executing a vector operation including a vector operation of elements corresponding to element numbers different from each other between two vector registers and a masked vector operation.

(Supplementary Note 11.1)

The information processing method according to Supplementary Note 11, wherein a masked vector cross operation is executed, the masked vector cross operating being to perform a masked vector operation of elements corresponding to element numbers different from each other by one between the two vector registers.

(Supplementary Note 11.2)

The information processing method according to Supplementary Note 17, wherein respective elements of a predetermined vector register are transferred to a new vector register in which element numbers shifted by at least one from those of the respective elements correspond to new element numbers, and a masked vector operation on the vector registers including the new vector register is executed.

The abovementioned program can be stored by the use of various types of non-transitory computer-readable mediums and supplied to a computer. A non-transitory computer-readable medium includes various types of tangible storage mediums. A non-transitory computer-readable medium includes, for example, a magnetic recording medium (for example, a flexible disk, a magnetic tape, a hard disk drive), a magnetooptical recording medium (for example, a magnetooptical disk), a CD-ROM (Read Only Memory), a CD-R, a CD-R/W, a semiconductor memory (for example, a mask ROM, a PROM (Programmable ROM), an EPROM (Erasable PROM), a flash memory, and a RAM (Random Access Memory). Moreover, a program may be supplied to a computer by various types of transitory computer-readable mediums. A transitory computer-readable medium includes, for example, an electric signal, an optical signal, and an electromagnetic wave. A transitory computer-readable medium can supply a program to a computer via a wired communication channel such as an electric cable and an optical fiber or via a wireless communication channel.

Although the present invention has been described above with reference to the example embodiments and so on, the present invention is not limited to the example embodiments. The configurations and details of the present invention can be changed in various manners that can be understood by one skilled in the art within the scope of the present invention.

The present invention is based upon and claims the benefit of priority from Japanese patent application No. 2018-178791, filed on Sep. 25, 2018, the disclosure of which is incorporated herein in its entirety by reference.

DESCRIPTION OF NUMERALS 1 compiler
10 loop analyzing unit
11 vectorization determining unit
12 complex number operation recognizing unit
20 vectorization executing unit
21 vector load instruction generating unit
22 complex number operation instruction generating unit
23 vector store instruction generating unit
100 information processing apparatus
110 load instruction generating unit
120 operation instruction generating unit

What is claimed is:

1. An information processing apparatus comprising:
a memory storing instructions; and
at least one processor configured to execute the instructions, the instructions comprising:
generating a first instruction to continuously access a memory in which a real part and an imaginary part composing complex data are alternately arranged, in accordance with arrangement of the real part and the imaginary part, and load the real part and the imaginary part as respective elements of a vector register;
generating one or more vector operation instructions to:
perform a vector operation on elements corresponding to element numbers different from each other between two vector registers that are identical to each other, yielding a vector operation result;
perform, with respect to the vector operation result, a masked vector cross operation on elements corresponding to element numbers different from each other by one between the two vector registers; and
perform masked vector subtraction of elements corresponding to element numbers different from each other by one between the two vector registers.

2. The information processing apparatus according to claim 1, wherein the masked vector cross operation is performed with a mask in which a vector register mask having elements repeating "1" and "0" is set such that an operation result is stored only in an element number of element "1".

3. The information processing apparatus according to claim 1, wherein the instructions further comprise generating a vector transfer instruction to transfer respective elements of a predetermined vector register to a new vector register in which element numbers shifted by at least one from those of the respective elements correspond to new element numbers,
wherein the two vector registers are the predetermined vector register and the new vector register.

4. The information processing apparatus according to claim 1, wherein the one or more vector operation instructions are generated based on program code including a loop operation on an array of the real part and the imaginary part composing the complex data.

5. The information processing apparatus according to claim 1, wherein the instructions further comprise generating a second instruction to continuously access respective elements of a vector register in which an operation result according to the generated one or more vector operation instructions is stored, and write the operation result into the memory.

6. An information processing method comprising:
generating, by a processor, a first instruction to continuously access a memory in which a real part and an imaginary part composing complex data are alternately arranged, in accordance with arrangement of the real part and the imaginary part, and load the real part and the imaginary part as respective elements of a vector register; and
generating, by the processor, one or more vector operation instructions to:
perform a vector operation on elements corresponding to element numbers different from each other between two vector registers that are identical to each other, yielding a vector operation result;
perform, with respect to the vector operation result, a masked vector cross operation on elements corresponding to element numbers different from each other by one between the two vector registers; and
perform masked vector subtraction of elements corresponding to element numbers different from each other by one between the two vector registers.

7. The information processing method according to claim 6, wherein the instructions further comprise generating a vector transfer instruction to transfer respective elements of a predetermined vector register to a new vector register in which element numbers shifted by at least one from those of the respective elements correspond to new element numbers,
wherein the two vector registers are the predetermined vector register and the new vector register.

8. The information processing method according to claim 6, wherein the one or more vector operation instructions are generated based on program code including a loop operation on an array of the real part and the imaginary part composing the complex data.

9. The information processing method according to claim 6, wherein the instructions further comprise generating a second instruction to continuously access respective elements of a vector register in which an operation result according to the generated one or more vector operation instructions is stored, and write the operation result into the memory.

10. An information processing apparatus comprising:
a memory storing instructions; and
at least one processor configured to execute the instructions, the instructions comprising:
generating a first instruction to continuously access a memory in which a real part and an imaginary part composing complex data are alternately arranged, in accordance with arrangement of the real part and the imaginary part, and load the real part and the imaginary part as respective elements of a vector register;
generating one or more vector operation instructions to:
perform a vector operation on elements corresponding to element numbers different from each other between two vector registers that are identical to each other, yielding a vector operation result;

perform, with respect to the vector operation result, a masked vector cross operation on elements corresponding to element numbers different from each other by one between the two vector registers; and perform masked vector addition of elements corresponding to element numbers different from each other by one between the two vector registers.

* * * * *